US007969858B2

(12) United States Patent
Laroia et al.

(10) Patent No.: US 7,969,858 B2
(45) Date of Patent: *Jun. 28, 2011

(54) WIRELESS TERMINAL METHODS AND APPARATUS FOR USE IN WIRELESS COMMUNICATIONS SYSTEMS SUPPORTING DIFFERENT SIZE FREQUENCY BANDS

(75) Inventors: Rajiv Laroia, Basking Ridge, NJ (US); Junyi Li, Bedminster, NJ (US); Vladimir Parizhsky, New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1332 days.

This patent is subject to a terminal disclaimer.

(21) Appl. No.: 11/247,963

(22) Filed: Oct. 11, 2005

(65) Prior Publication Data

US 2006/0083159 A1 Apr. 20, 2006

Related U.S. Application Data

(60) Provisional application No. 60/618,616, filed on Oct. 14, 2004.

(51) Int. Cl.
*H04J 11/00* (2006.01)
(52) U.S. Cl. .................................... 370/208; 370/319
(58) Field of Classification Search .................. None
See application file for complete search history.

(56) References Cited

U.S. PATENT DOCUMENTS

| 6,285,654 B1 | 9/2001 | Marchok et al. |
| 6,449,245 B1 | 9/2002 | Ikeda et al. |
| 6,768,714 B1 | 7/2004 | Heinonen et al. |
| 6,782,039 B2 | 8/2004 | Alamouti et al. |
| 2002/0044524 A1 | 4/2002 | Laroia et al. |

(Continued)

FOREIGN PATENT DOCUMENTS

JP 07099522 4/1995

(Continued)

OTHER PUBLICATIONS

Preliminary Report on Patentability; Mail Date: Apr. 26, 2007 with Written Opinion of the International Searching Authority; Mail Date: Nov. 27, 2006, 2006 for International Application No. PCT/US2005/036736; pp. 1-4.

(Continued)

*Primary Examiner* — Seema S Rao
*Assistant Examiner* — Rhonda Murphy
(74) *Attorney, Agent, or Firm* — Donald C. Kordich

(57) ABSTRACT

More efficient utilization of available bandwidth is implemented in an OFDM wireless communication system. The partitions of bandwidth may be of different sizes and may be different from the original system design parameters. Basic system structure such as the number of tones used and the number of OFDM symbol times in a slot is maintained throughout the system. Bandwidth is varied by adjusting the inter-tone spacing or bandwidth associated with a single tone. As the inter-tone spacing is increased, the OFDM symbol transmission time is decreased following an inverse proportional relationship. A wireless communications device, during a first period of time transmits signals using a first uplink frequency band of a first number of uniformly distributed tones and during a second period of time transmits signals using a second uplink frequency band of a second number of uniformly distributed tones, the second number being the same as the first number, the second frequency band being wider than the first frequency band.

42 Claims, 18 Drawing Sheets

U.S. PATENT DOCUMENTS

| | | | |
|---|---|---|---|
| 2002/0159512 A1* | 10/2002 | Matsumoto | 375/222 |
| 2003/0012308 A1 | 1/2003 | Sampath et al. | |
| 2003/0231700 A1 | 12/2003 | Alamouti et al. | |
| 2004/0081075 A1* | 4/2004 | Tsukakoshi | 370/206 |
| 2004/0151109 A1 | 8/2004 | Batra et al. | |
| 2004/0184484 A1 | 9/2004 | Marchok et al. | |
| 2004/0228269 A1 | 11/2004 | Balakrishnan et al. | |
| 2005/0164642 A1 | 7/2005 | Roberts | |
| 2005/0259758 A1* | 11/2005 | Razzell | 375/260 |
| 2006/0083159 A1 | 4/2006 | Laroia et al. | |

FOREIGN PATENT DOCUMENTS

| | | |
|---|---|---|
| JP | 09135230 | 5/1997 |
| JP | 2000216753 | 8/2000 |
| JP | 2002101062 | 4/2002 |
| JP | 2002330467 | 11/2002 |
| JP | 2005110014 | 4/2005 |
| JP | 2005150850 | 6/2005 |
| JP | 2006504367 | 2/2006 |
| JP | 2008017532 | 1/2008 |
| WO | WO2006118062 | 11/2006 |
| WO | WO2007015494 | 2/2007 |

OTHER PUBLICATIONS

International Search Report for International Application No. PCT/US2005/036736; Mail Date: Nov. 27, 2006; pp. 1-3.

* cited by examiner

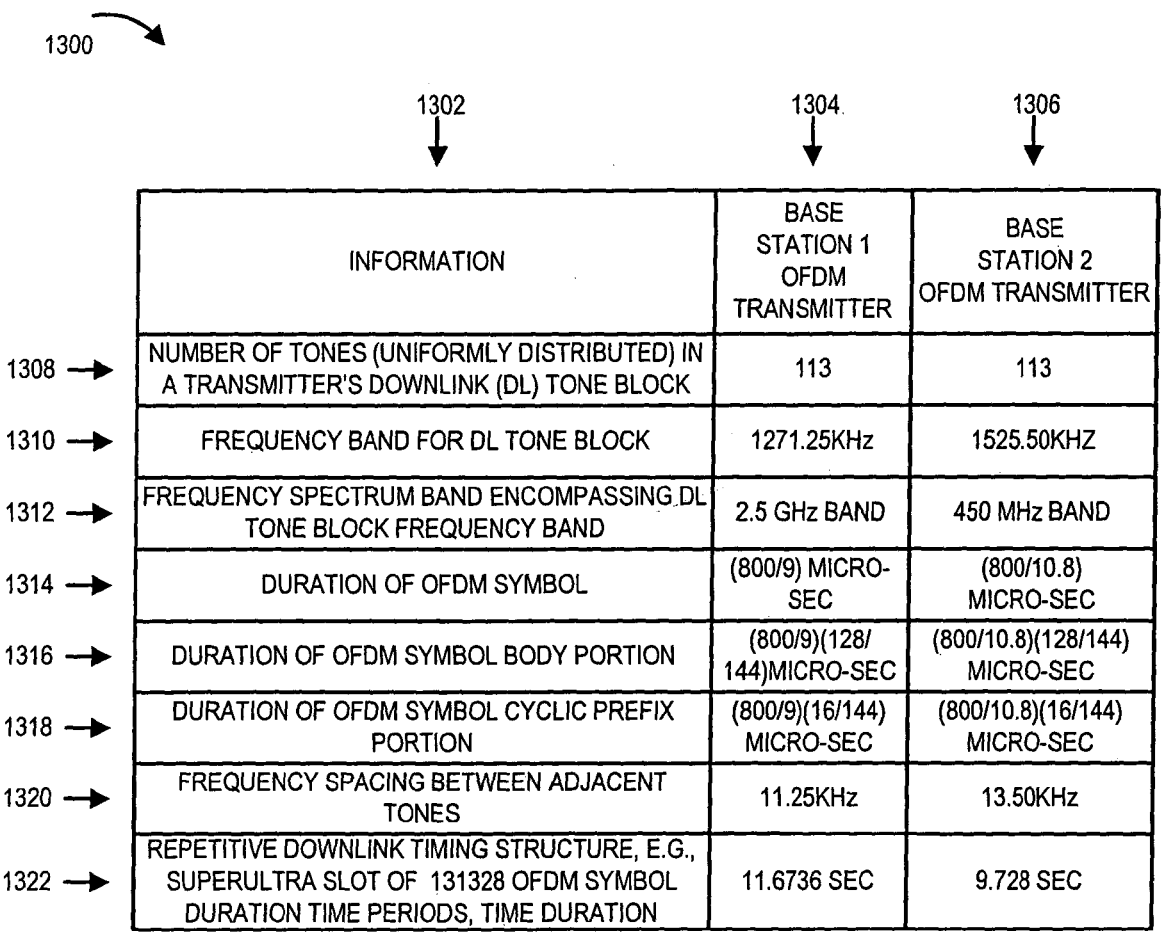

| | | 1302 | 1304 | 1306 |
|---|---|---|---|---|
| | | INFORMATION | BASE STATION 1 OFDM TRANSMITTER | BASE STATION 2 OFDM TRANSMITTER |
| 1308 → | | NUMBER OF TONES (UNIFORMLY DISTRIBUTED) IN A TRANSMITTER'S DOWNLINK (DL) TONE BLOCK | 113 | 113 |
| 1310 → | | FREQUENCY BAND FOR DL TONE BLOCK | 1271.25KHz | 1525.50KHZ |
| 1312 → | | FREQUENCY SPECTRUM BAND ENCOMPASSING DL TONE BLOCK FREQUENCY BAND | 2.5 GHz BAND | 450 MHz BAND |
| 1314 → | | DURATION OF OFDM SYMBOL | (800/9) MICRO-SEC | (800/10.8) MICRO-SEC |
| 1316 → | | DURATION OF OFDM SYMBOL BODY PORTION | (800/9)(128/144)MICRO-SEC | (800/10.8)(128/144) MICRO-SEC |
| 1318 → | | DURATION OF OFDM SYMBOL CYCLIC PREFIX PORTION | (800/9)(16/144) MICRO-SEC | (800/10.8)(16/144) MICRO-SEC |
| 1320 → | | FREQUENCY SPACING BETWEEN ADJACENT TONES | 11.25KHz | 13.50KHz |
| 1322 → | | REPETITIVE DOWNLINK TIMING STRUCTURE, E.G., SUPERULTRA SLOT OF 131328 OFDM SYMBOL DURATION TIME PERIODS, TIME DURATION | 11.6736 SEC | 9.728 SEC |

FIGURE 13

tone 113 166). The inter-tone spacing (184, 186) is the same between each tone, e.g., 11.25 KHz. The inter-tone spacing of 11.25 kHz also represents the bandwidth allocated to a single tone. Similarly, OFDM signaling within band 156 includes signals communicated on OFDM modulation symbols using, e.g., 113 evenly spaced tones (tone 1 168, tone 2 170, tone 3 172, … tone 113 174). The inter-tone spacing (188, 190) is the same between each tone, e.g., 11.25 KHz. Similarly, the OFDM signaling within band 158 includes signals communicated on OFDM modulation symbols using, e.g., 113 evenly spaced tones (tone 1 176, tone 2 178, tone 3 180, … tone 113 182). The inter-tone spacing (192, 194) is the same between each tone, e.g., 11.25 KHz. With OFDM signaling, unlike CDMA signaling, quite sharp power shaping filters can be used due to the nature of the OFDM signals. Drawing 150 shows three exemplary power shaping filters (151, 153, 155), each associated with a bandwidth only slightly larger than 1.27 MHZ (157, 159, 161), respectively. This leaves a remaining unused bandwidth of slightly less than 1.19 MHz, as represented by the composite of regions 163, 165, 167, and 169. This amount is less than the standard size of 1.27 MHz needed for an additional standard band, yet sizeable.

In the exemplary OFDM system, the remainder unused bandwidth may be a result of the exemplary 5 MHZ system being different than what the system was originally designed. For example, the exemplary OFDM system may have been originally designed for distinct bandwidth allocations of approximately 1.27 MHz.

In view of the above, there is a need for methods and apparatus, particularly in OFDM systems, that increase or maximize the use of available allocated bandwidth. Methods and apparatus that flexibly allow for adaptations to changes in available bandwidth would be beneficial. Changes could be in response, e.g., to additional bandwidth licensed to a service provider or to dynamic redeployments of bandwidth to meet current user needs. In addition, designs that allow wireless terminals (WTs) to readily adjust to use different amounts of bandwidth in different sectors and/or cells of the same system would be advantageous. In such multiple bandwidth OFDM systems, there is also a need for efficient methods and apparatus to communicate from a base station to the WTs the bandwidth and/or structure associated with the cell and/or sector.

SUMMARY

Methods and apparatus for wireless communications systems are described. A method of operating a wireless communication device comprises: during a first period of time: i) transmitting signals on a first number of tones distributed uniformly in a first frequency band; and during a second period of time: i) transmitting signals on a second number of tones distributed uniformly in a second frequency band; which is wider than said first frequency band, said second number of tones being the same as said first number of tones. A wireless communication terminal comprises: a transmission control module for controlling a wireless terminal to operate in different modes of operation using tones of different widths during the different modes of operation, the transmission control module including: a transmitter; a first mode control module for controlling transmission operation during said first mode of operation, said first mode control module controlling the transmitter to transmit signals on a first number of tones distributed uniformly in a first frequency band; and a second mode control module for controlling transmission operation during said second mode of operation, said second mode control module controlling the transmitter to transmit signals on a second number of tones distributed uniformly in a second frequency band which is wider than said first frequency band, said second number of tones being the same as said first number of tones.

While various embodiments have been discussed in the summary above, it should be appreciated that not necessarily all embodiments include the same features and some of the features described above are not necessary but can be desirable in some embodiments. Numerous additional features, benefits and details of the various methods and apparatus of the present invention are discussed in the detailed description which follows.

BRIEF DESCRIPTION OF THE FIGURES

FIG. 13 is a table illustrating exemplary information corresponding to two exemplary base stations which are part of an exemplary communications system, implemented in accordance with the present invention.

DETAILED DESCRIPTION

Figure 1:
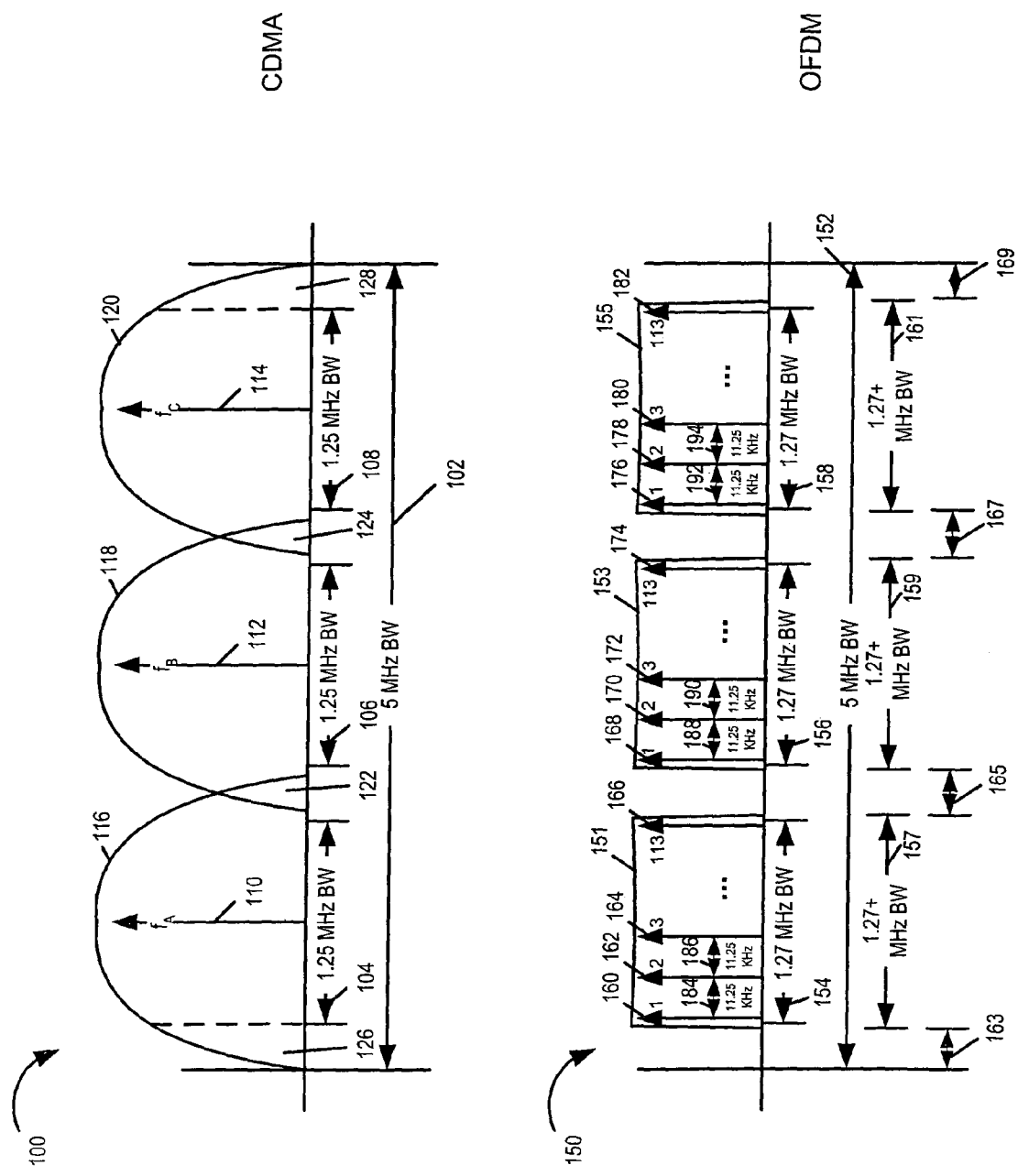
FIG. 1 includes a drawing illustrating exemplary partitioning of BW in an exemplary CDMA system and a drawing illustrating exemplary partitioning of BW in an exemplary OFDM system.
Figure 2:
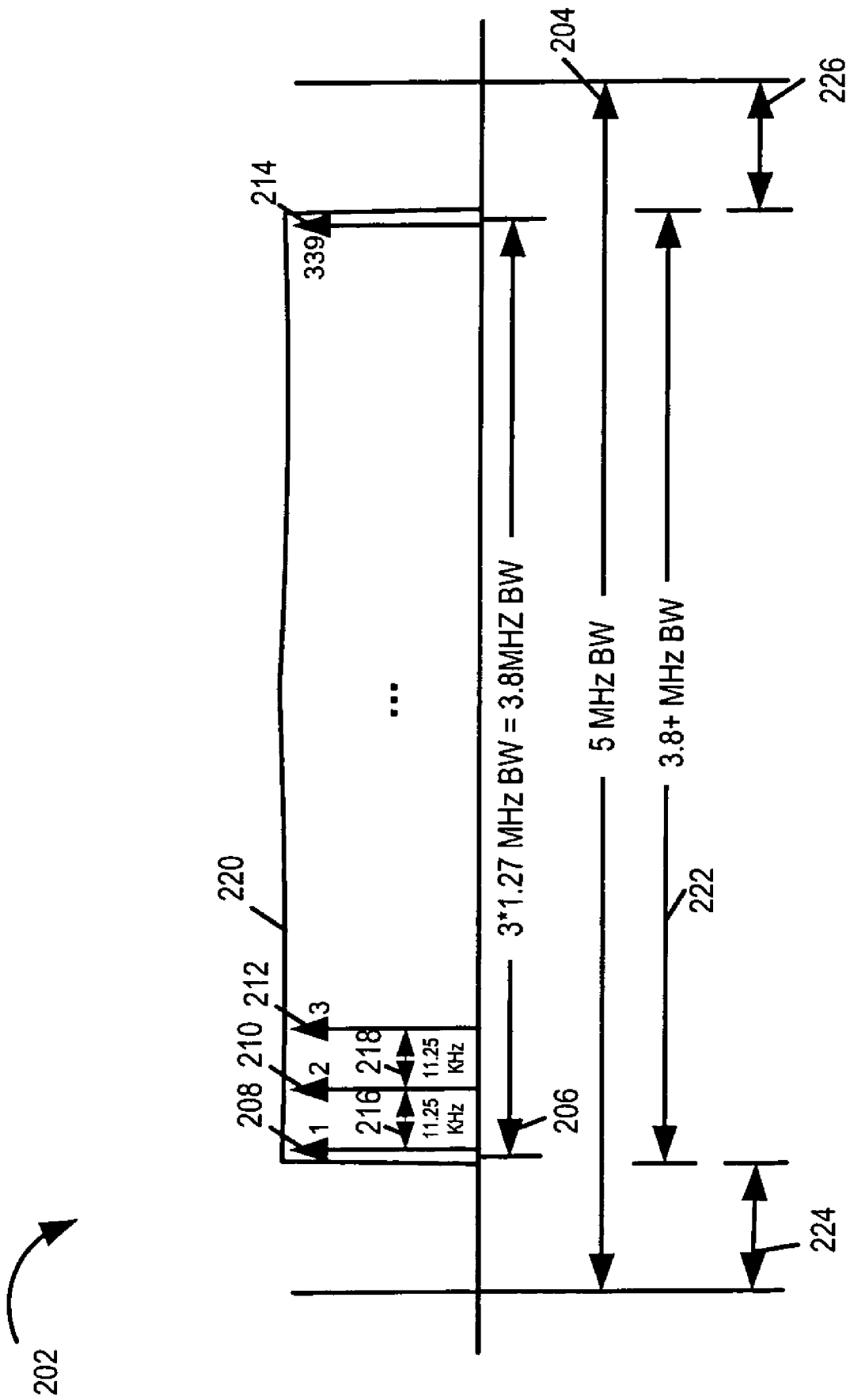
FIG. 2 is a drawing illustrating exemplary OFDM tones with a first inter-tone spacing that may be used in an exemplary system, in accordance with the present invention.

FIG. 2 is a drawing 202 illustrating exemplary OFDM tones in an exemplary 5 MHz BW 204 system. Three hundred and thirty-nine tones (tone 1 208, tone 2 210, tone 3 212, ... tone 339 214) are evenly spaced as shown by exemplary 11.25 KHz spacing (216, 218). The 339 tones, representing three sets of 113 tones/set, occupy a total bandwidth of 3*1.27 MHz or approximately a 3.8 MHz band 206. Power shaping filter 220, slightly larger than the 3.8 MHz band, occupies frequency band 222. This leaves a remainder portion, comprising the combination of regions 224 and 226, of slightly less than 1.2 MHz which is unused and can be partially utilized in accordance with the methods of the present invention.

Figure 3:
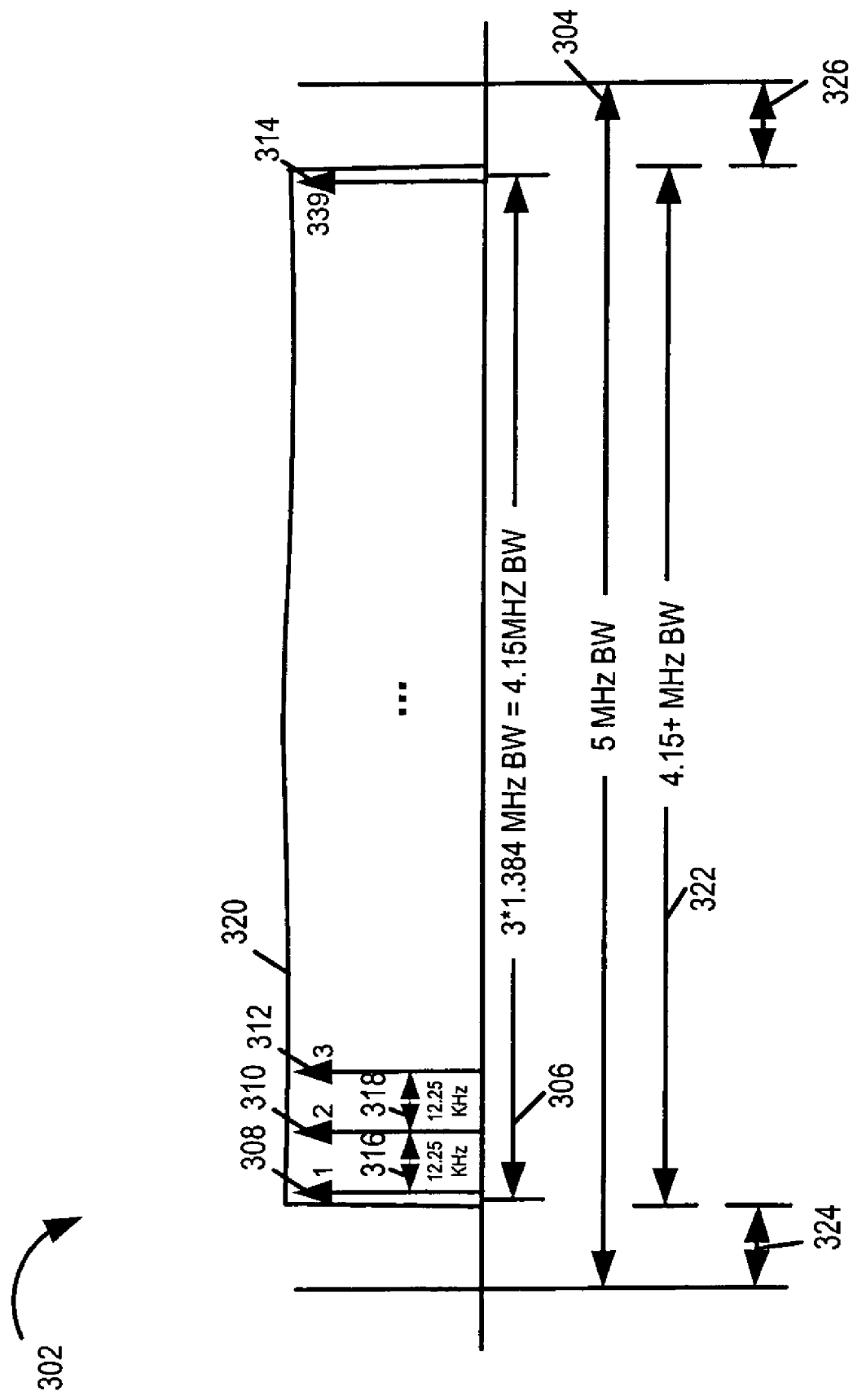
FIG. 3 is a drawing illustrating an exemplary variation of the system structure of FIG. 2, wherein the same number of OFDM tones has been structured using a different inter-tone spacing and occupying a different amount of bandwidth, in accordance with the present invention.

FIG. 3 is a drawing 302 illustrating exemplary OFDM tones in an exemplary 5 MHz BW 304 system. Three hundred and thirty-nine tones (tone 1 308, tone 2 310, tone 3 312, ... tone 339 314) are evenly spaced as shown by exemplary 12.25 KHz spacing (316, 318). The inter-tone spacing has been increased from 11.25 KHZ (FIG. 3) to 12.25 KHz (FIG. 3), in accordance with the methods of the present invention, to more fully utilize the available bandwidth. The 339 tones, representing three sets of 113 tones/set, occupy a total bandwidth of 3*1.384 MHz or approximately a 4.15 MHz band 306. Power shaping filter 320, slightly larger than the 4.15 MHz occupies frequency band 322. This leaves a remainder portion, comprising the combination of regions 324 and 326, of slightly less than 0.85 MHz which is unused.

Figure 4:
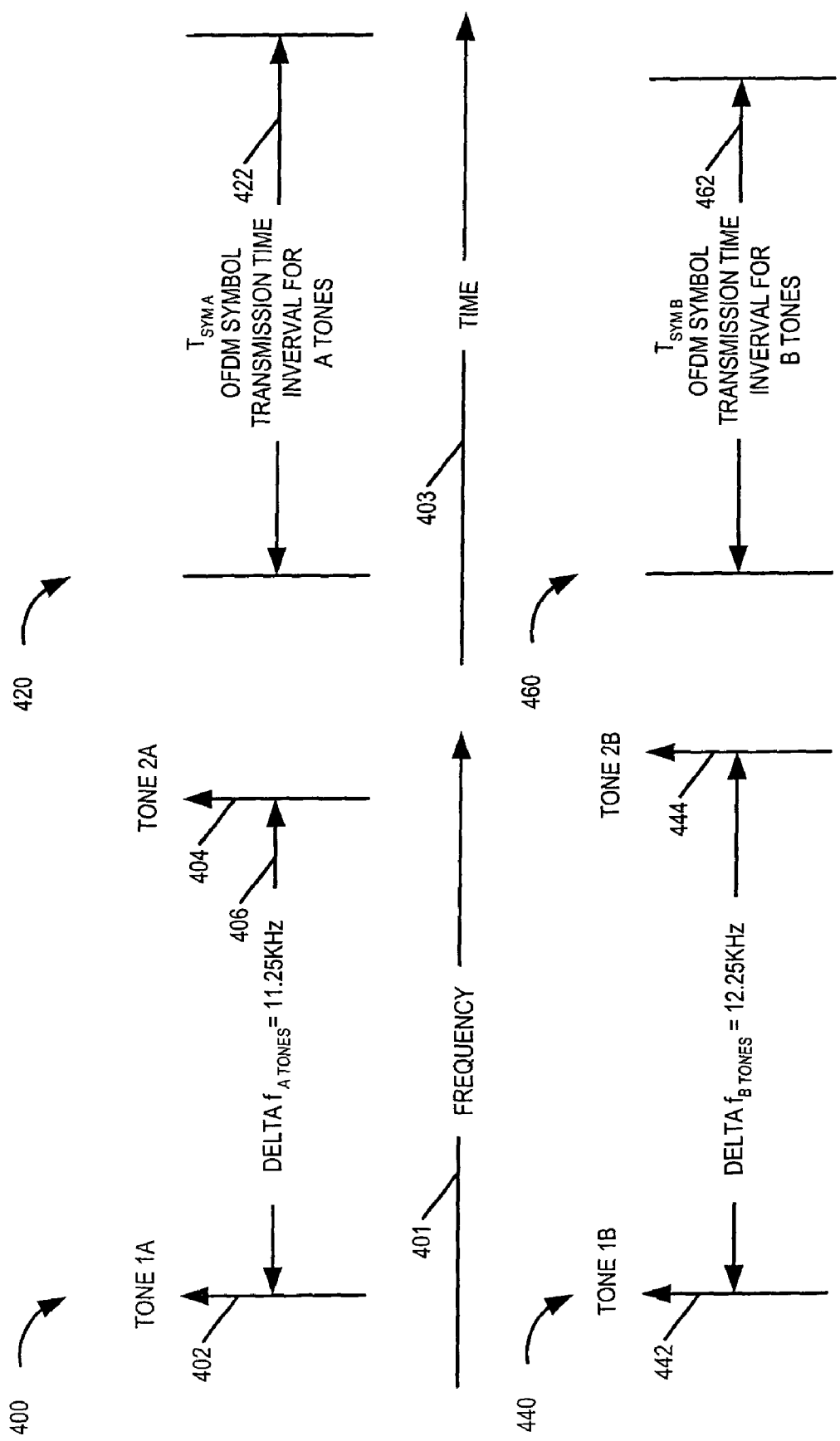
FIG. 4 includes exemplary diagrams and is used to illustrate features of the present invention describing tone frequency interspacing variation linked to corresponding OFDM symbol transmission time interval variation, in accordance with the methods of the present invention.

FIG. 4 includes diagrams 400, 420, 440, and 460 used to illustrate features of the present invention describing tone frequency interspacing variation linked to corresponding OFDM symbol transmission time interval variation, in accordance with the methods of the present invention. FIG. 4 shows a frequency axis 401 which applies to both diagrams 400 and 440 and a time axis 403 which applies to both diagrams 420 and 460.

Diagram 400 shows two exemplary tones, tone 1A 402 and tone 2A 404, with an inter-tone spacing of 11.25 KHz 406. The 11.25 KHz inter-tone spacing 406 may also be viewed as the bandwidth associated with a single tone 402, 404. Corresponding to frequency diagram 400 is time diagram 420, which shows OFDM symbol transmission time interval for A tones, $T_{sym\_A}$ 422. A modulation symbol is transmitted on a single tone, e.g., tone 1A 402, during OFDM symbol transmission time, $T_{sym\_A}$ 422.

Diagram 440 shows two exemplary tones, tone 1B 442 and tone 2B 444, with an inter-tone spacing of 12.25 KHz 446.

The 12.25 KHz inter-tone spacing 446 may also be viewed as the bandwidth associated with a single tone 442, 444. Corresponding to frequency diagram 440 is time diagram 460, which shows OFDM symbol transmission time interval for B tones, $T_{sym\_B}$ 462. A modulation symbol is transmitted on a single tone, e.g., tone 1B 442, during OFDM symbol transmission time, $T_{sym\_B}$ 462.

It may be observed in FIG. 4 that there is an inverse relationship between the tone interspacing and the OFDM symbol transmission time interval. As the tone inter-spacing increases to occupy more bandwidth, the OFDM symbol transmission tone decreases proportionally, in accordance with the present invention. For a given modulation symbol communicated, the same amount of air link resource, represented as bandwidth over time is consumed, in either case. In addition, the system can use the same basic structure, e.g., same number of total tones, same tone indexing schemes, same hopping sequences, same number of tones per slot, same number of tones per superslot, etc. in either of the two variations. However, in the variation represented by diagrams 440 and 460, the available overall bandwidth is being more fully utilized, and more modulation symbols are communicated for a given time duration. This can result in a data rate increase proportional to the frequency spacing increase.

Figure 5:
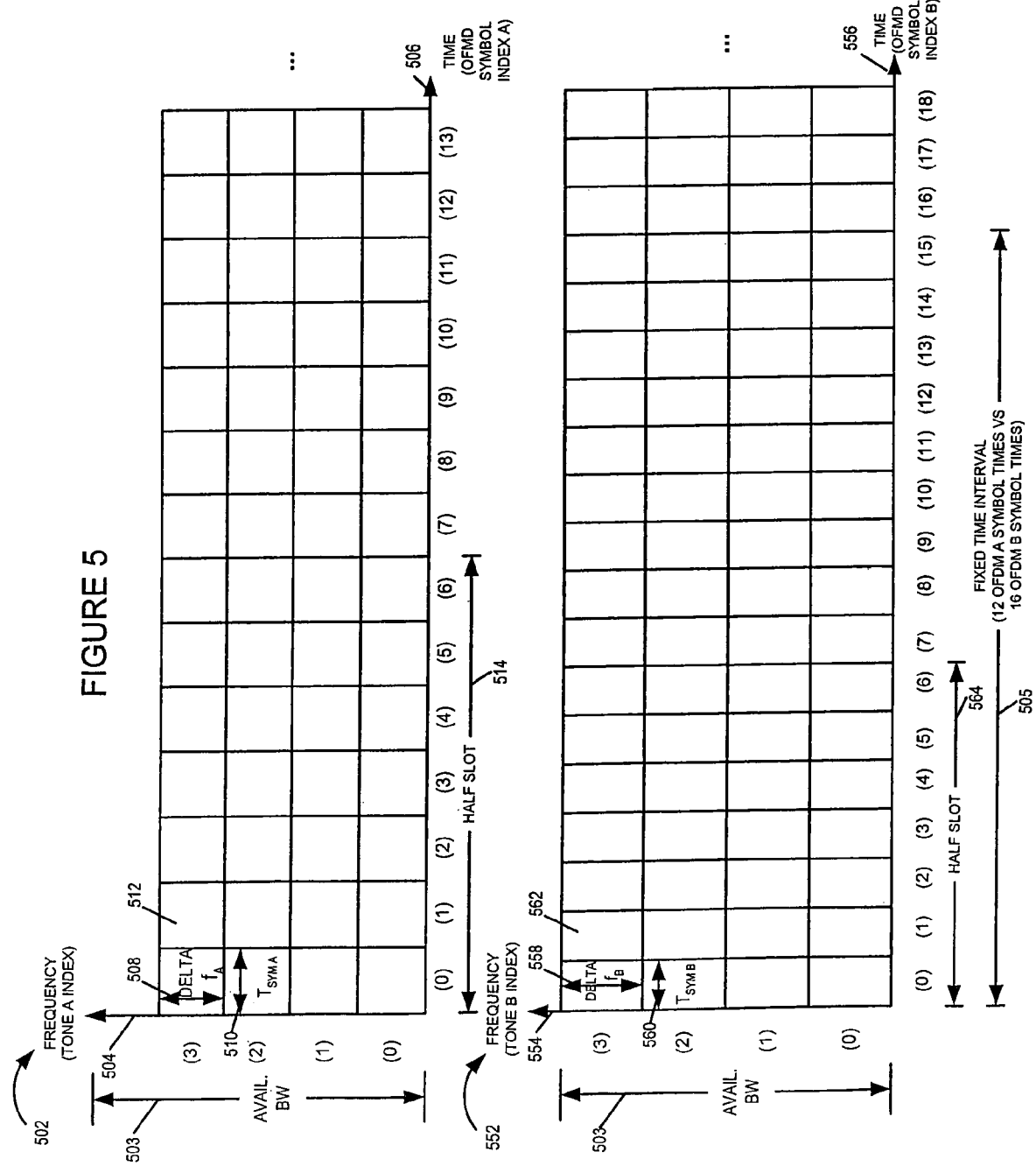
FIG. 5 is a drawing illustrating a comparison between exemplary tone inter-spacing variations and showing more efficient use of available bandwidth, in accordance with the present invention.

FIG. 5 includes frequency vs time drawings 502, 552 to further illustrate the features of the present invention. Diagram 502 is a drawing of frequency on the vertical axis 504 vs time on the horizontal axis 506. Alternate representations are shown in parenthesis as (tone A index) on vertical axis 504 and (OFDM symbol index for A tones) on horizontal axis 506. The available bandwidth 503 is larger than the bandwidth occupied by the four tones used (index=0, 1, 2, 3). Each tone occupies a frequency bandwidth, delta $f_A$ 508. An OFDM symbol transmission time interval, $T_{SYMA}$ 510 is the time to transmit one modulation symbol using a single tone. Each basic element of the air link resource, used for conveying a modulation symbol, is a tone-symbol 512 and is represented by a square box. Seven successive OFDM symbol times represent a half slot 514.

Diagram 552 is a drawing of frequency on the vertical axis 554 vs time on the horizontal axis 556. The frequency vs time scaling shown in drawing 552 is the same as shown in drawing 502. Alternate representations are shown in parenthesis as (tone B index) on vertical axis 554 and (OFDM symbol index for B tones) on horizontal axis 556. The available bandwidth 503 in drawing 552 is the same as the available bandwidth 503 in drawing 502. In drawing 552, bandwidth 503 is fully occupied by the four tones used (index=0, 1, 2, 3). Each tone occupies a frequency bandwidth, delta $f_B$ 558, larger than delta $f_A$ 508. An OFDM symbol transmission time interval, $T_{SYMB}$ 560 is the time to transmit one modulation symbol using a single type B tone, and is smaller than $T_{SYMA}$ 510. Each basic element of the air link resource, used for conveying a modulation symbol, is a tone-symbol 562 and is represented by a rectangular box. Seven successive OFDM symbol times represent a half slot 564. It may be observed that the half slot 564 is shorter in duration than the half slot 514. Fixed time interval 505 is equivalent to the time represented by 12 OFDM symbol times of diagram 502 or the time represented by 16 symbol times in diagram 552. Each type of tone-symbol 512, 562 can convey the same or nearly the same amount of information. During a fixed time 505, on average, 48 tone-symbols, alternately referred to as transmission units, are available to convey modulation symbols with respect to drawing 502; however, on average, 64 tone-symbols are available with respect to drawing 552.

Diagram 600 is used to illustrate an exemplary method of conveying bandwidth information from an exemplary base station to an exemplary WT in accordance with the methods of the present invention. The BS, sector or cell transmitters sends out downlink broadcast signaling, e.g. beacon signals, pilot signals, other broadcast signals such as assignment signals, and the WT can monitor, receive, and figure out the characteristics of the frequency band based on the information conveyed.

Figure 6:
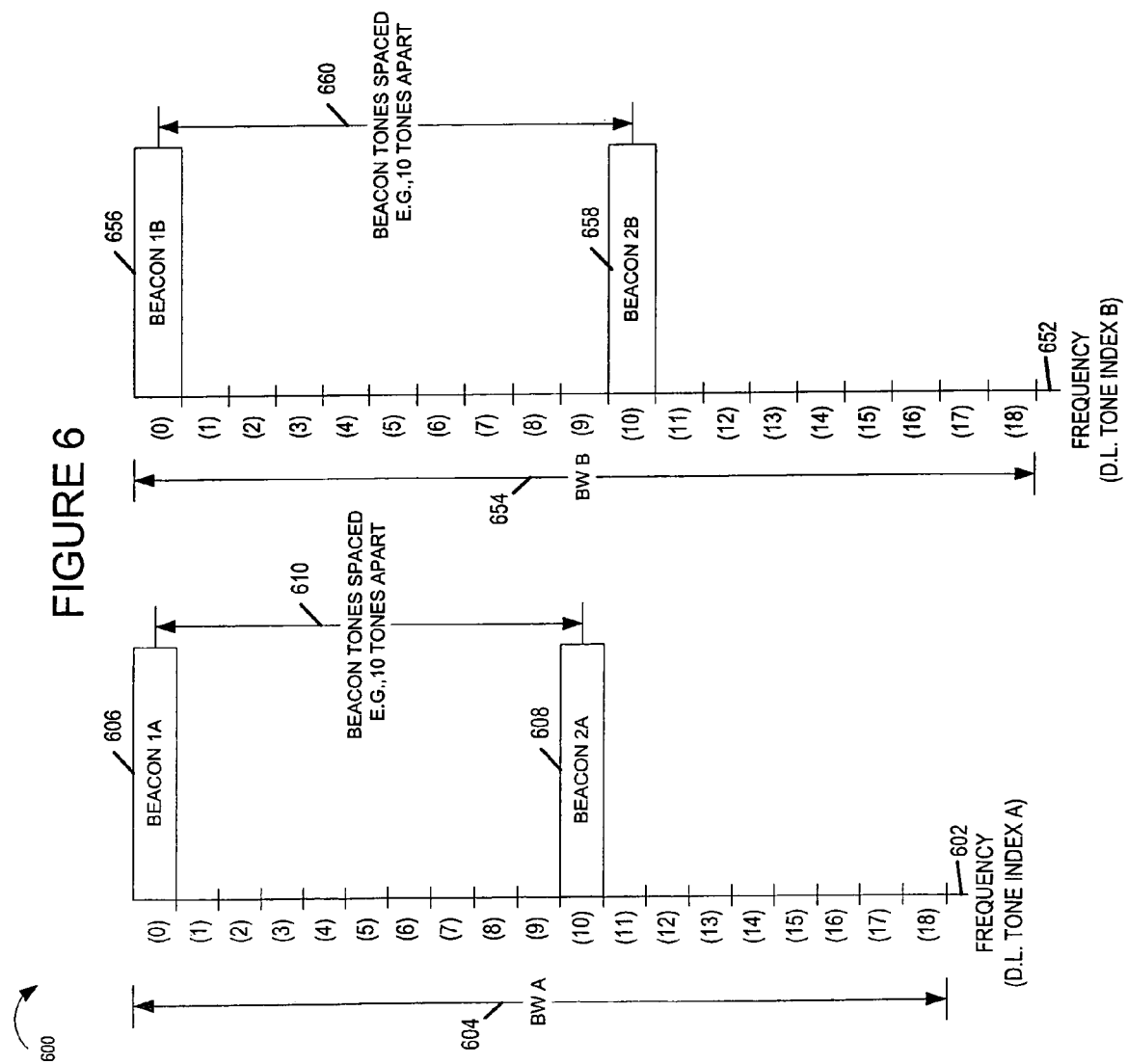
FIG. 6 is a drawing illustrating exemplary beacon signals that are used to convey band characteristics information from a base station (BS) to wireless terminals, in accordance with the present invention.

In the example of FIG. 6, drawing 600 shows an exemplary BW A 604 including 19 tones (index 0 . . . 18). Vertical axis 602 represents frequency; vertical axis 602 also represents using parenthesis (downlink tone index for A type tones). Beacon signals, e.g., high power signals with the base station sector transmit power concentrated on one or a few tones are shown as beacon 1A 606 at tone index 0 and beacon 2A 608 at tone index 10. In this example, the beacon signals 606, 608 have been spaced a fixed number of tones apart 610, e.g., 10 tones apart, in accordance with the invention.

Similarly drawing 600 also shows an exemplary BW B 654 including 19 tones (index 0 . . . 18). Vertical axis 652 represents frequency; vertical axis 652 also represents using parenthesis (downlink tone index for B type tones). Beacon signals are shown as beacon 1B 656 at tone index 0 and beacon 2B 658 at tone index 10. In this example, the beacon signals have been spaced a fixed number of tones apart 660, e.g., 10 tones apart, in accordance with the invention.

In an exemplary system, in a first region of the system, e.g., a first sector/cell combination, the base station can be implemented for the structure of BW A with type A tones, while in a second region, e.g., a second sector/cell combination, the base station can implemented for the structure of BW B with type B tones. In both regions the same total number of tones are employed and the same basic structures are used based on indexing numbers.

It should be noted that the frequency difference represented by 610 is smaller than the frequency difference represented by 660; however, the tone index count difference is the same. Wireless terminals can monitor for the beacons, receive the pair of beacon signals, and knowing the fixed tone-indexing difference between the two beacon signals, calculate the appropriate inter-tone spacing for the transmitter of the beacon signal pair. Having the system structured to use the same number of tones, irrespective of the bandwidth variation, allows the WTs, knowing the number of tones used in the system, to determine the bandwidth from the beacon signal spacing. Then, in accordance with the invention, the WT adjusts its clock to correspond to the appropriate inter-tone spacing. This adjustment of its clock also changes the OFDM symbol timing used proportionally. This method, in accordance with the invention, allows a WT to identify and readily adapt to various BWs, yet still maintain basic system structure, e.g., same number tones, same number of OFDM symbol times/slot, same number of OFDM symbol times/superslot. This approach, in accordance with the present invention, facilitates a flexible, low cost implementation approach to more fully utilizing available bandwidth in an OFDM environment.

Figure 10:
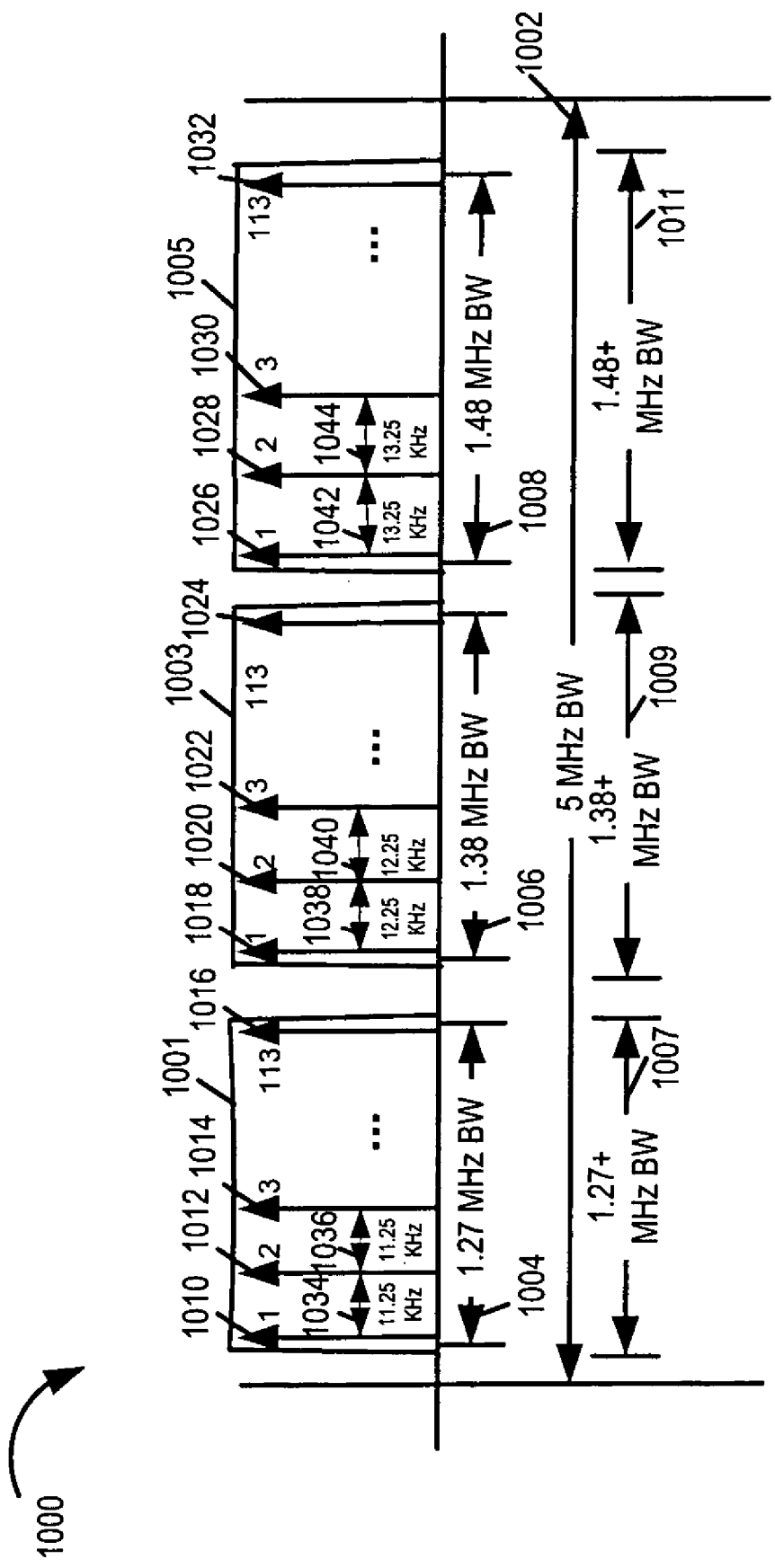
FIG. 10 is a drawing of another exemplary bandwidth partition in accordance with the present invention.

FIG. 10 is a drawing 1000 illustrating an exemplary 5 MHz BW 1002 that has been partitioned to include three bands: a 1.27 MHz BW band 1004, a 1.38 MHz BW band 1006, and a 1.48 MHz BW band 1008, in accordance with the present invention. Each band includes 113 OFDM tones that may be used for OFDM signaling; the inter-tone spacing is different for each band. The 1.27 MHZ band 1004 includes tones (tone 1 1010, tone 2 1012, tone 3 1014, . . . tone 113 1016) with inter-tone spacing (1034, 1036) of 11.25 KHz. Band 1004 uses power shaping filter 1001 occupying a BW 1007 slightly larger than 1.27 MHz. The 1.38 MH band 1006 includes tones (tone 1 1018, tone 2 1020, tone 3 1022, . . . tone 113 1024) with inter-tone spacing (1038, 1040) of 12.25 KHz. Band 1006 uses power shaping filter 1003 occupying a BW 1009 slightly larger than 1.38 MHz. The 1.48 MH band 1008 includes tones (tone 1 1026, tone 2 1028, tone 3 1030, . . . tone 113 1032) with inter-tone spacing (1042, 1044) of 13.25 KHz. Band 1008 uses power shaping filter 1005 occupying a BW 1011 slightly larger than 1.48 MHz.

In FIG. 10, bands (1004, 1006, 1008) may correspond to (sector A, sector B, sector C), respectively, in a given cell. The different BWs may have been chosen and matched to correspond to meet different loading conditions within the given sectors. Wireless terminals, moving between the different sectors, may use the methods of the present invention, to determine the characteristics of the band within the sector and adjust, e.g., adjust its clock, for proper operation and synchronization with the sector.

Figure 7:
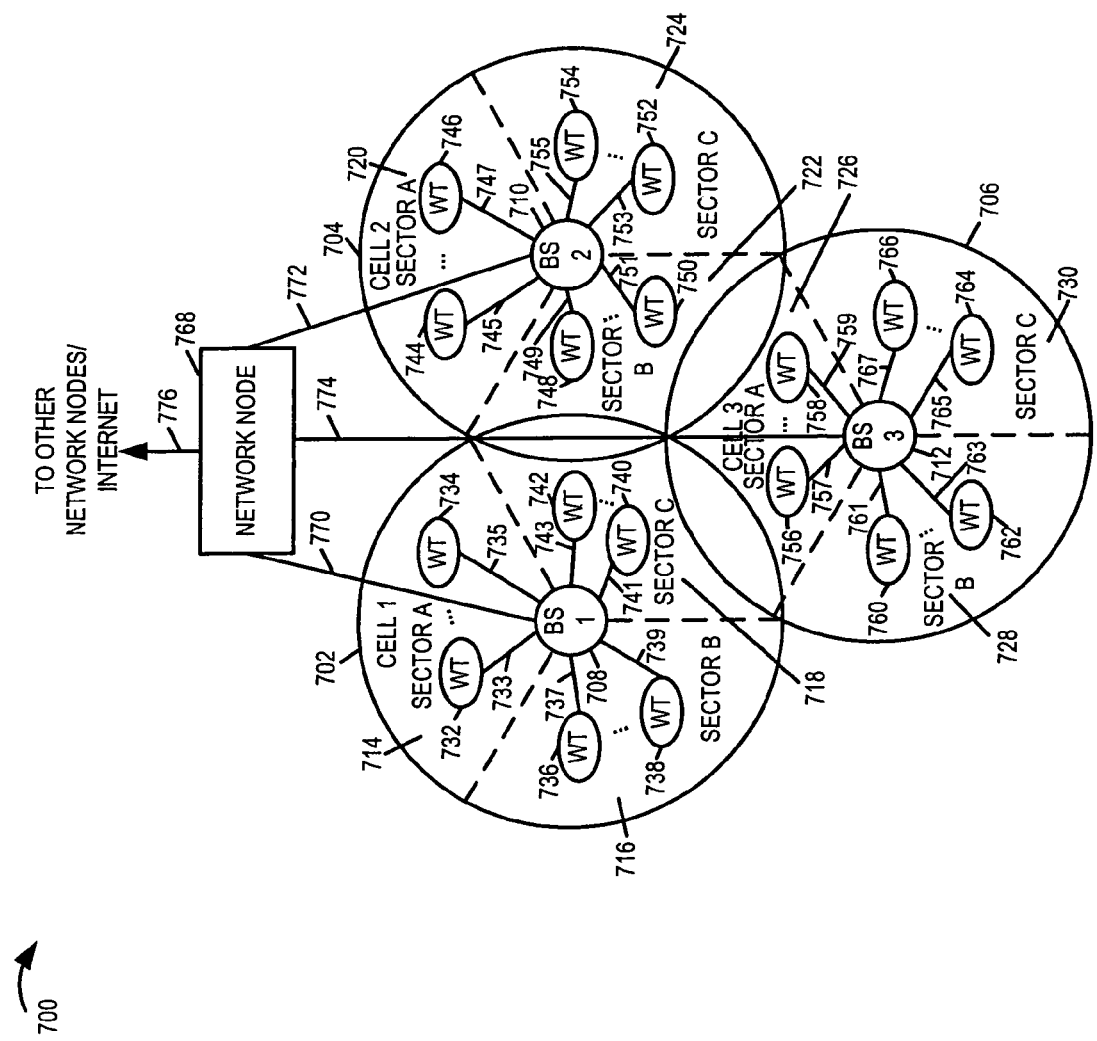
FIG. 7 is a drawing of an exemplary wireless communication system implemented in accordance with the present invention and using methods of the present invention.

FIG. 7 shows an exemplary wireless communications system 700, supporting adjustable bandwidth allocation, implemented in accordance with the present invention. The system 700 uses apparatus and methods of the present invention. FIG. 7 includes a plurality of exemplary multi-sector cells, cell 1 702, cell 2 704, cell 3 706. Each cell (702, 704, 706) represents a wireless coverage area for a base station (BS), (BS1 708, BS2 710, BS 3 712), respectively. In the exemplary embodiment, each cell 702, 704, 706 includes three sectors (A,B,C). Cell 1 702 includes sector A 714, sector B 716, and sector C 718. Cell 2 704 includes sector A 720, sector B 722, and sector C 724. Cell 3 706 includes sector A 726, sector B 728, and sector C 730. In other embodiments, different numbers of sectors per cell are possible, e.g., 1 sector per cell, 2 sectors per cell, or more than 3 sectors per cell. In addition, different cells may include different numbers of sectors.

BSs 708, 710, 712 include sectorized transmitters and each sectorized transmitter transmits downlink broadcast signals, e.g., beacon signals, pilots signals, assignment signals, etc.; some of the broadcast signals convey sector band characteristic information such as, e.g., tone inter-spacing, in accordance with the present invention. Wireless terminals (WTs), e.g., mobile nodes (MNs), may move throughout the system, determine a sector's band characteristics based in part on received broadcast signals, and reconfigure to adapt to the sector band characteristics corresponding to a desired base station sector attachment point. Wireless terminals communicate with peer nodes, e.g., other MNs, via wireless links to BSs. In cell 1 702 sector A 714, WTs (732, 734) are coupled to BS 1 708 via wireless links (733, 735), respectively. In cell 1 702 sector B 716, WTs (736, 738) are coupled to BS 1 708 via wireless links (737, 739), respectively. In cell 1 702 sector C 718, WTs (740, 742) are coupled to BS 1 708 via wireless links (741, 743), respectively. In cell 2 704 sector A 720, WTs (744, 746) are coupled to BS 2 710 via wireless links (745, 747), respectively. In cell 2 704 sector B 722, WTs (748, 750) are coupled to BS 2 710 via wireless links (749, 751), respectively. In cell 2 704 sector C 724, WTs (752, 754) are coupled to BS 2 710 via wireless links (753, 755), respectively. In cell 3 706 sector A 726, WTs (756, 758) are coupled to BS 3 712 via wireless links (757, 759), respectively. In cell 3 706 sector B 728, WTs (760, 762) are coupled to BS 3 712 via wireless links (761, 763), respectively. In cell 3 706 sector C 730, WTs (764, 766) are coupled to BS 3 712 via wireless links (765, 767), respectively.

BSs may be coupled together via a network, thus providing connectivity for WTs within a given cell to peers located outside the given cell. In system 700, BSs (708, 710, 712) are coupled to network node 768 via network links (770, 772, 774), respectively. Network node 768, e.g., a router, is coupled to other network nodes, e.g., other base stations, routers, home agent nodes, AAA server nodes, etc., and the Internet via network link 776. Networks links 770, 772, 774, 776 may be, e.g., fiber optic links.

Figure 8:
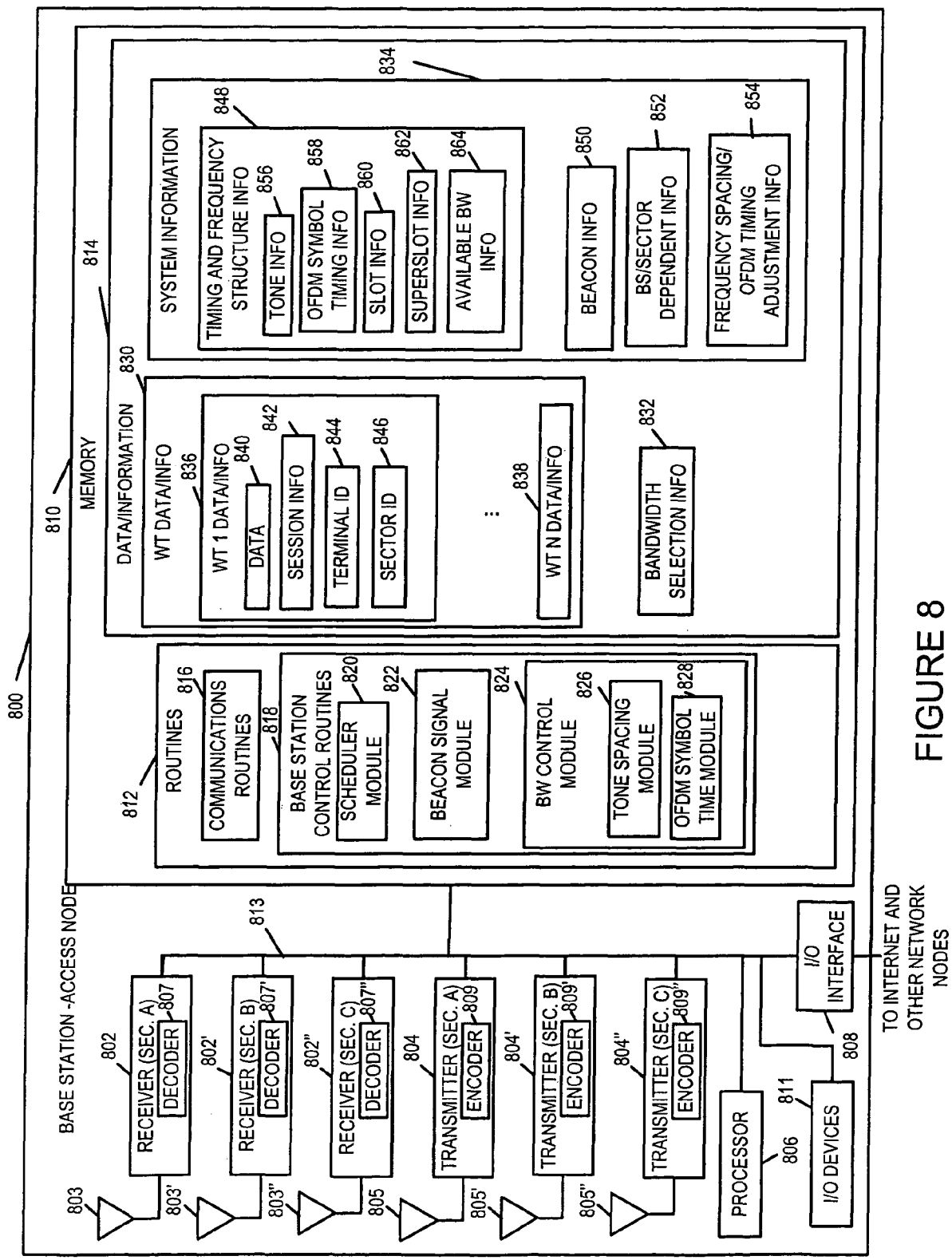
FIG. 8 is a drawing of an exemplary base station—access node implemented in accordance with the present invention and using methods of the present invention.

FIG. 8 is a drawing of an exemplary base station—access node 800 implemented in accordance with the present invention and using methods of the present invention. Exemplary base station 800 may be any of the BSs 708, 710, 712 of system 700 of FIG. 7. Exemplary base station 800 includes a plurality of receivers: a sector A receiver 802, a sector B receiver 802', and a sector C receiver 802", each receiver (802, 802' 802") coupled to a receiver antenna (803, 803', 803"), respectively. Exemplary base station 800 also includes a plurality of transmitters: a sector A transmitter 804, a sector B transmitter 804', and a sector C transmitter 804", each transmitter (804, 804' 804") coupled to a transmitter antenna (805, 805', 805"), respectively. Each sector receiver (802, 802', 802") includes a decoder (807, 807', 807"), respectively, for decoding uplink signals including uplink traffic channel signals, e.g. uplink user data, received from WTs 900 (See FIG. 9). Each sector transmitter (804, 804', 804") includes an encoder (809, 809', 809") for encoding downlink signals including downlink broadcast signals such as, e.g., beacon signals, and for encoding downlink traffic channel signals, e.g., user data. Base station 800 also includes a processor 806, an I/O interface 808, a memory 810, and I/O devices 811. The receivers (802, 802', 802"), the transmitters (804, 804', 804"), the processor 806, the I/O interface 808, the memory 810, and the I/O devices 811 are coupled together via bus 813 over which the various elements may interchange data and information.

The memory 810 includes routines 812 and data/information 814. The processor 806, e.g., a CPU, executes the routines 812 and uses the data/information 814 in memory 810 to control the operation of the base station 800 and implement the methods of the present invention including setting band characteristics for each sector and communicating band characteristic information to WTs. The I/O interface 808 couples the BS 800 to the Internet and other network nodes, e.g., routers, other BSs 800, AAA servers, etc., providing connectivity from BS 800 to other nodes of the system an allowing a WT coupled to BS 800 via a wireless link to communicate with other WTs in different cells of the system. The I/O devices 811, e.g., keyboard, mouse, and display terminal, provides an interface for a system administrator to configure the base station, e.g., selecting band information such as bandwidth, inter-tone spacing, number of tones, tone frequency range, beacon tones, etc., for each sector.

Routines 812 include communications routines 816 and base station control routines 818. Communications routines 816 implement the various communications protocols used by BS 800. Base station control routines 818 include a scheduler module 820, a beacon signal module 822, and a bandwidth control module 824. The bandwidth control module 824 includes a tone spacing module 826 and an OFDM symbol time module 828.

Data information 814 includes WT Data/Information 830, bandwidth selection information 832, and system information 834. WT data/information 830 includes a plurality of sets of WT data/info: WT1 data/information 836, WT N data/information 838. WT 1 data/information 836 includes data 840, session information 842, terminal ID 844, and sector ID 846. Data 840, e.g., user data, includes information from/to WT 1 intended for/received from peer nodes of WT1. Session information 842 includes information regarding communication sessions between WT1 and other peer nodes, e.g., routing information. Terminal ID 844 is a base station assigned ID for WT1. Sector ID information 846 includes an identification of the sector, e.g., sector A, through which WT1 is coupled to BS 800.

Bandwidth selection information 832 includes information identifying the bandwidth associated with each sector. Bandwidth selection information 832 may have been pre-programmed in BS 800, entered through user I/O devices 811, and/or changed in response to monitored system loading information.

System information 848 includes timing and frequency structure information 848, beacon information 850, BS/sector dependent information 852, and frequency spacing/OFDM timing adjustment information 854. Timing and frequency structure information 848 includes tone information 856, OFDM symbol timing information 858, slot information 860, superslot information 862, and available BW information 864. In some embodiments, the timing and frequency structure information 848 defines basic structural parameters used throughout the system, which remain unchanged as the band allocation is adjusted at different locations in the system, in accordance with the methods of the present invention. Such uniformity of basic structural information allows WTs to readily adapt to different bandwidth allocation, without extensive reconfigurations. Tone information 856 includes information such as the number of tones used, e.g., 113 tones, and the nominal tone spacing. OFDM symbol timing information 858 includes information such as the nominal timing used to transmit one OFDM modulation symbol using one tone. Slot information 860 includes information such as the number of OFDM symbol times comprising one slot, e.g., 16. Superslot information 862 includes information such as the number of slots, e.g., 8 comprising one superslot. Avaliable BW information 864 includes information such as the amount of BW available, e.g., 5 MHz total bandwidth that may be partitioned to be used between the sectors of the BS.

Beacon information 850 includes information defining the tones and power levels associated with the beacon signals. Beacon information 850, in accordance with various embodiments of the invention, includes band characteristic information, e.g., information used to convey tone inter-spacing to WTs by a predetermined beacon tone index number spacing used throughout the system, e.g., 10 tones separating beacons signals from the same base station sector transmitter. Other band characteristic information may include information used to identify a boundary of a frequency band, e.g., a beacon signal using an end tone of its frequency band. In some embodiments, beacon information 850 may also include sector and/or cell identification information.

BS/sector dependent information 852 includes information corresponding to the base station, e.g., a control parameter such as slope used in a hopping sequence pilot signals to allow WTs to identify the BS/sector transmitter. Other BS/sector dependent information may include specific frequencies, bandwidths, base tones, etc., associated with a sector of operation.

Frequency spacing/OFDM timing adjustment information 854 includes information such as the amount of frequency spacing/OFDM symbol timing adjustment from the nominal information included information 848 for each sector. In some embodiments, information 854 includes clock adjustment factors which when implemented for a sector adjust both the tone frequency spacing and the OFDM symbol timing in concert, e.g., as tone symbol spacing increases to increase allocated bandwidth, the OFDM symbol transmission time interval decreases proportionally. In some embodiments, adjustment values may be selected from a set of discrete adjustment steps.

The base station control routines 818 control the operation of the base station 800 including the receivers 802, 802', 802", the transmitters 804, 804', 804", the I/O interface 808 and I/O devices 811, and routines 818 controls the implementation of methods of the present invention including bandwidth adjustment. The scheduler module 820, e.g., a scheduler, makes decisions regarding the scheduling of uplink and downlink traffic channel segments to competing users, e.g., based on a set of rules and priorities. Beacon signal module 822 uses the data information 814 including bandwidth selection information 832 and system information 834 to control the generation and transmission of beacon signals for each sector. The beacon signals, e.g., high power broadcast signals with the sector transmitter energy concentrated on one or a few tones, may convey base station and sector identification information. In addition, in accordance with the present invention, the beacon signals, convey band characteristic information to WTs, e.g., tone spacing, band bandwidth, base tone reference information, etc., corresponding to the band being used by the sector. BW control module 824 controls the operation of the BS 800 to maintain and operate on specific bands for each sector. Tone spacing module 826 uses the bandwidth selection information 832 to select adjustment information from the frequency spacing/OFDM timing adjustment info 854 to alter the nominal tone spacing included in tone info 856. OFDM symbol time module 828 uses the bandwidth selection information 832 to select adjustment information from the frequency spacing/OFDM timing adjustment info 854 to alter the OFDM nominal timing included in tone info 856. In some embodiments, a single adjustment module performs the functions of modules 826, 828, e.g., by adjusting a clock setting within the base station corresponding to a sector.

Figure 9:
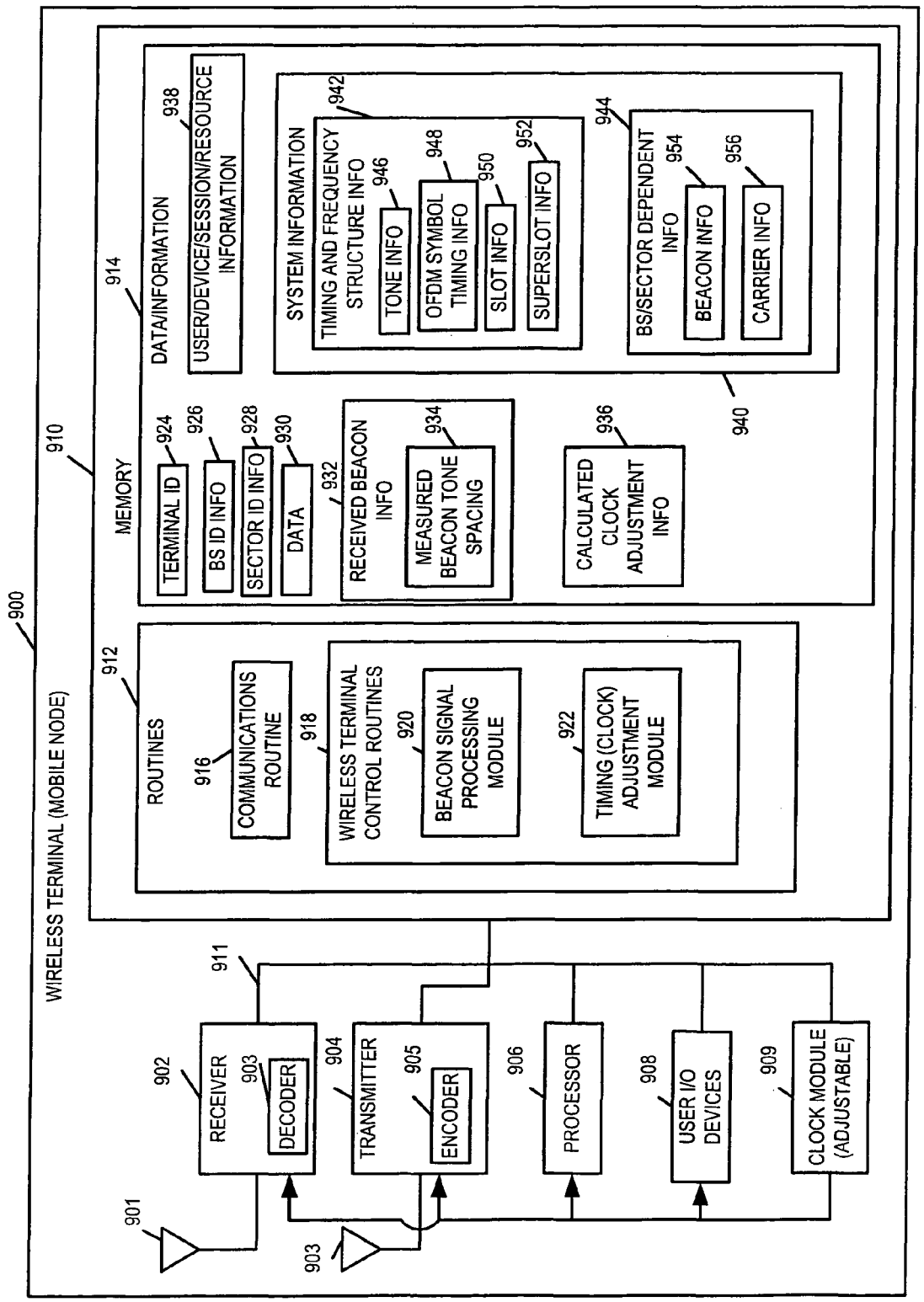
FIG. 9 is a drawing of an exemplary wireless terminal, e.g., mobile node, implemented in accordance with the present invention and using methods of the present invention.

FIG. 9 is a drawing of an exemplary wireless terminal 900, e.g., mobile node, implemented in accordance with the present invention and using methods of the present invention. Exemplary wireless terminal 900 may be any of the WTs 732, 734, 736, 738, 740, 742, 744, 746, 748, 750, 752, 754, 756, 758, 760, 762, 764, 766 of exemplary system 700 of FIG. 7. Exemplary wireless terminal 900 includes a receiver 902 coupled to a receiver antenna 901. Exemplary wireless terminal 900 also includes a transmitter 904 coupled to a transmitter antenna 903. Receiver 902 includes a decoder 903 for decoding downlink signals including downlink broadcast signals such as, e.g., beacon signals, pilot signals, assignment signals, and downlink unicast or multicast signals, e.g., user data, intended for WT 900. Transmitter 904 includes an encoder 905 for encoding uplink signals including uplink traffic channel signals, e.g., user data from WT 900. Wireless terminal 900 also includes a processor 906, user I/O devices 908, an adjustable clock module 909 and memory 910. The receiver 902, the transmitter 904, the processor 906, the I/O user devices 908, the adjustable clock module 909, and the memory 910 are coupled together via bus 911 over which the various elements may interchange data and information.

The memory 910 includes routines 912 and data/information 914. The processor 906, e.g., a CPU, executes the routines 912 and uses the data/information 914 in memory 910 to control the operation of the wireless terminal 900 and implement the methods of the present invention including reception of band characteristic information and adjustment of the WT 900 to operate using the communicated band characteristics. The user I/O devices 908, e.g., displays, keyboards, keypads, mouse, microphone, speakers, etc., allow the user of WT 900 to receive and access data and information from other users, e.g., peer nodes, and to enter data/information to be communicated to other users.

Routines 912 include communications routines 916 and wireless terminal control routines 918. Communications routines 916 implement the various communications protocols used by WT 900. Wireless terminal control routines 918 include a beacon signal processing module 920 and a timing (clock) adjustment module 922.

Data/information 914 includes a terminal identifier (ID) 924, BS identifier information 926, sector ID information 928, data 930, received beacon information 932 including measured beacon tone spacing information 934, calculated clock adjustment information 936, user/device/session/resource information 938, and system information 940.

The terminal ID 924 is a base station assigned user ID, e.g., an active user ID. BS ID info 926 includes information, e.g., a value of slope obtained from the pilot symbols, identifying the base station being used as an attachment point currently for WT 900. Sector ID information 928 is, e.g., a value of a sector type identifier used to identify the current sector in which WT 900 is operating. Data 930, e.g., user data, includes data to be received from and/or transmitted to a peer node of WT 900 in a communications session with WT 900 via BS 800.

Received beacon information 932 includes information that has been extracted from the received and processed beacon signals, e.g., the identify of the BS and sector transmitter which generated the beacon signal, received power levels of beacon signals, and a measured beacon tone spacing 934. For example, for a given base station sector, the sector transmitter transmits a beacon signal(s) such that two tones in a set of n tones are used and are spaced apart by a known number of tones, e.g., a first beacon signal using a tone with index number x, and a second tone with index number (x+10). Two beacon signals may be communicated at different times each using one tone, e.g., in a sequence, or both tones may be transmitted simultaneously. Calculated clock adjustment information 936 includes an adjustment value, e.g., a scale factor or offset, based on measured beacon tone spacing 934 that is used to set band characteristics within WT 900 to match the sector base station to which the WT 900 is to use as an attachment point.

User/device/session/resource/information 938 includes information pertaining to communication sessions with peer nodes, e.g., identifying and routing information pertaining to the peer node.

System information 940 includes timing and frequency structure information 942 and BS/sector dependent information 944. Timing and frequency structure information 942 includes tone information 946, OFDM symbol timing information 948, slot information 950, and superslot information 952. In some embodiments, the timing and frequency structure information 942 defines basic structural parameters used throughout the system, which remain unchanged as the band allocation is adjusted at different locations in the system, in accordance with the methods of the present invention. Such uniformity of basic structural information allows WT 900 to readily adapt to different bandwidth allocations, without extensive reconfigurations. Tone information 946 includes information such as the number of tones used, e.g., 113 tones, and the nominal tone spacing. OFDM symbol timing information 948 includes information such as the nominal timing used to transmit one OFDM modulation symbol using one tone. Slot information 950 includes information such as the number of OFDM symbol times comprising one slot, e.g., 16.

Superslot information 952 includes information such as the number of slots, e.g., 8 comprising one superslot.

BS/sector dependent information 944 includes beacon information 954 and carrier information 956. For example, different base station sector transmitters may use different sets of beacon signals, e.g., using different tones, so that the WT 900 receiving the beacon signal can identify the source. Such base station/sector identification information conveyed via beacon signals is included in beacon info 954. Different sectors within different cells of the system may use and be associated with different carrier frequencies; such information may be included in carrier info 956.

Wireless terminal control routines 918 control the operation of the wireless terminal 900 including the receiver 902, transmitter 904, and user I/O devices 908; routines 918 also implement methods of the present invention receiving band characteristic information and adjusting the settings within the WT 900 to operate on an allocated frequency band in accordance with the present invention.

Beacon signal processing module 920 uses the data/information 914 including beacon info 954 to control the receiver 902 to receive and process beacon signals obtaining received beacon information 932 including measured beacon tone spacing 934. The timing (clock) adjustment module 922 uses the data/information 914 including the measured beacon tone spacing 934 to determine calculated clock adjustment information 936, which can be used should the WT 900 decide to use the corresponding sector base station as its point of attachment. Based on the calculated clock adjustment information 936, the WT 900 controls adjustable clock module 909 to match the sector base station's tone inter-spacing and OFDM symbol timing. The output from the adjustable clock module 909, in the exemplary embodiment, goes to user I/O devices 908, processor 906, receiver 902, and transmitter 904. The processor 906 in conjunction with the receiver 902 and transmitter 904 controls operations in WT 900 such that the nominal timing and frequency structure of information 942 is altered thus matching the actual tone interspacing and OFDM symbol transmission timing being used by the sector base station attachment point and thus providing for synchronized operations.

Figure 11:
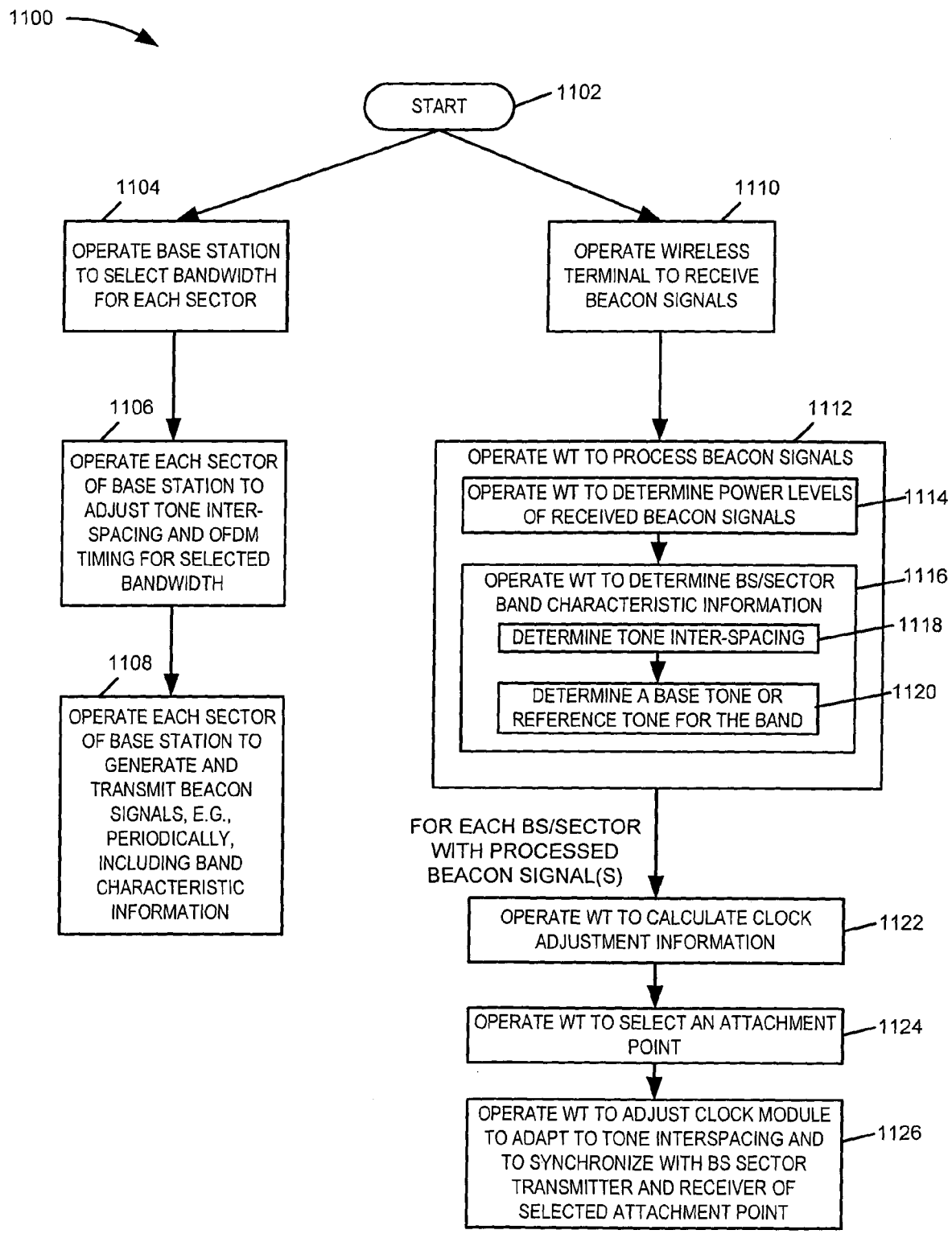
FIG. 11 is a drawing of a flowchart illustrating an exemplary method of using different band structuring in different areas in a wireless system and communicating the band characteristic information from BSs to WTs, which adjust to match the base station, in accordance with the present invention.

FIG. 11 is a drawing of a flowchart 1100 illustrating an exemplary method of operating an exemplary wireless communications system with different bandwidths in different portions of the system in accordance with the present invention. In step 1102 operation is started, and base stations are powered on and initialized. Operation proceeds from step 1102 to step 1104 and step 1110.

In step 1104, a base station is operated to select bandwidth for each sector. For example, a base station may select to use 1.38 MHz BW for each of three sectors out of a total allocated BW of 5 MHz. In some embodiments, different bandwidths may be used in different sectors. In some embodiments, the bandwidth for at least some sectors is predetermined and fixed. In some embodiments, the bandwidth for at least some sectors is variable and may be changed during operation, e.g., to account for different loading levels at different times. In some embodiments, bandwidths are selected from a set of discrete levels. In some embodiments, bandwidth is selected via user input, e.g., system administrator input. Operation proceeds from step 1104 to step 1106. In step 1106, the BS is operated to adjust tone inter-spacing and OFDM symbol timing for the selected bandwidth for each sector. For example, a system may use a fixed number of tones (e.g., 113), and the tone inter-spacing may be adjusted from a nominal setting of 11.25 KHz (corresponding to a nominal BW of 1.27 MHz) to a new setting of 12.25 KHz (corresponding to a BW of 1.38

MHz), while the OFDM symbol time may be adjusted in concert down from a nominal value proportionally. Operation proceeds from step 1106 to step 1108. In step 1108, the base station is operated on a sector basis to generate and transmit beacon signals, e.g., periodically, at least some of said beacon signals including band characteristic information. For example, a sector base station transmitter may generate and transmit, e.g., periodically, a beacon signal using a tone with index=x, and a tone with index=x+10; the difference in tones of 10 index units may fixed throughout the system, irrespective of the bandwidth selected or cell/sector or operation. The value of x may be an identifier used to associate the beacon signal with a specific base station and sector. Alternately, the base station sector transmitter may transmit two beacon signals at different times, e.g., alternately, a first beacon signal with tone index x, and a second beacon signal with tone index x+10. In addition in some embodiments, the base station may transmit a reference beacon signal including a reference tone, e.g., the first tone of the band. In some embodiments, the base station may alternate between transmitting different types of beacon signals.

In step 1110, a wireless terminal is powered on and operated to receive beacon signals. The beacon signals are high power signals, with all or most of the sector transmitter energy concentrated on one or a few tones. The beacons signals are readily detected by the WTs and the WTs need not have precise timing synchronization with the BSs in order to process at least some of the beacon signals. For example, the WT may currently be set on a nominal bandwidth of 1.27 MHz with its associated inter-tone spacing and OFDM symbol transmission timing; however the received beacon may be operating with a inter-tone spacing and OFDM timing corresponding to 1.38 MHZ BW. Operation proceeds from step 1110 to step 1112. In step 1112, the WT is operated to process beacon signals. In sub-step 1114, the WT determines power levels of the received beacon signals. In sub-step 1116, the WT is operated to determine BS/sector band characteristic information via sub-steps 1118 and 1120. In sub-step 1118, the WT determines tone-interspacing. For example, consider that an exemplary first type beacon signal will include two tones separated by 10 tone index units irrespective of the bandwidth employed or the sector cell of the system. The WT, knowing this fixed relationship, can measure the separation in terms of frequency and calculate the inter-tone spacing or the width of a single tone, and knowing the number of tones used in the system, can calculate the bandwidth employed by the sector base station. In sub-step 1120, the WT determines the frequency of a base tone or reference tone for the band, e.g., from a reference type beacon signal.

Operation proceeds from step 1112 to step 1122. In step 1122, for each BS/sector with corresponding processed beacon signal(s), the WT is operated to calculate clock adjustment information, e.g., an offset or scaling from the current setting of the WT or from a nominal setting for the WT. Operation proceeds from step 1122 to step 1124. In step 1124, the WT is operated to select an attachment point, e.g., the sector base station corresponding to the strongest received beacon signals. Operation proceeds from step 1124 to step 1126. In step 1126, the WT is operated to adjust its clock module to adapt to the tone interspacing and bandwidth of the BS sector transmitter/receiver that has been selected in step 1124 using clock adjustment information from step 1122. In step 1126, the WT 900 may also be synchronized with the BS sector transmitter/receiver so that regular signals, e.g., uplink and downlink traffic channel signals may be processed.

Although described in the context of beacon signals, band characteristic information, in accordance with the invention, may be conveyed and determined from other broadcast signals such as, e.g., pilot signals.

In some embodiments, other components of the band characteristics may be changed, in addition to or in place of tone interspacing, to utilize bandwidth. For example, the number of OFDM tones used in a given band may change from one area of the system to another area. In such an embodiment, broadcast signals, e.g., beacon signals, may be used, in accordance with the present invention, to convey such information to the WTs, so that the WTs can adapt to correspond to the bandwidth, structure and format used by that sector of the base station to which the WT desires to attach.

Figure 12:
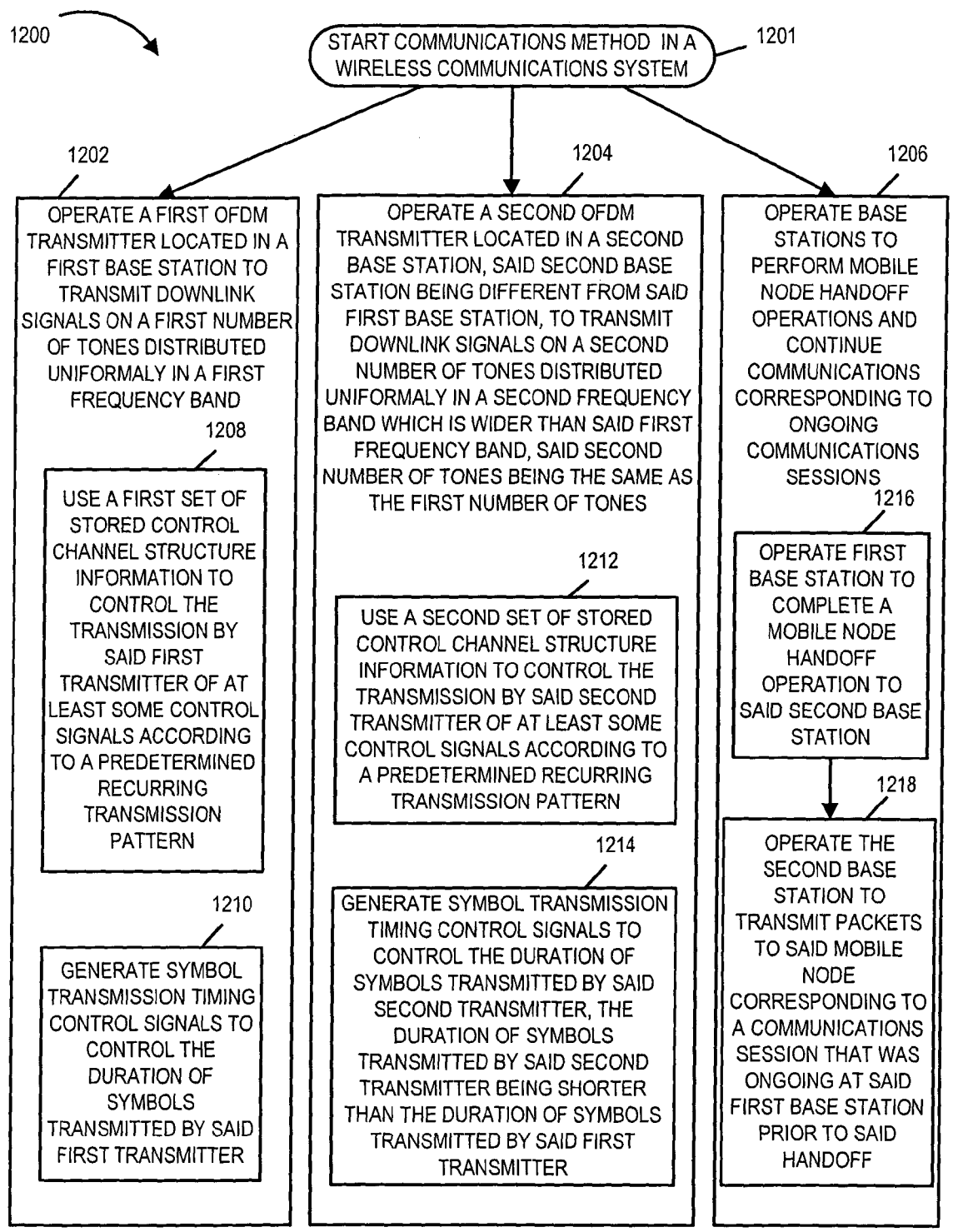
FIG. 12 is a drawing of a flowchart of an exemplary communications method in accordance with the present invention for use in a wireless communications system.

FIG. 12 is a drawing of a flowchart 1200 of an exemplary communications method in accordance with the present invention for use in a wireless communications system, e.g., an orthogonal frequency division multiplexing system (OFDM) spread spectrum multiple access wireless communications system including a plurality of base stations and a plurality of wireless terminals, e.g., mobile nodes. The exemplary method starts in step 1201, where a plurality of base stations in the system are powered on and initialized. Operation proceeds from start step 1201 to steps 1202, 1204, and 1206. Steps 1202 and 1204 are performed in parallel. Step 1206 is performed in response to a mobile node handoff initiation, e.g., from a mobile node, from a base station, or from another node such as a centralized control node in the wireless communications system.

In step 1202, a first OFDM transmitter located in a first base station is operated to transmit downlink signals on a first number of tones distributed uniformly in a first frequency band. Step 1202 includes sub-step 1208 and sub-step 1210. In sub-step 1208, the first base station is operated to use a first set of stored control channel structure information to control the transmission by said first transmitter of at least some control signals according to a predetermined recurring transmission pattern. In sub-step 1210, the first base station is operated to generate symbol transmission timing control signals to control the duration of symbols transmitted by said first transmitter.

In step 1204, a second OFDM transmitter located in a second base station, said second base station being different from said first base station, is operated to transmit downlink signals on a second number of tones distributed uniformly in a second frequency band which is wider than said first frequency band, said second number of tones being the same as the first number of tones. In some embodiments, the first number of tones is at least 10 tones. For example in some embodiments, the first number of tones is 113 tones. In another exemplary embodiment, the first number of tones is 339 tones. Step 1204 includes sub-step 1212 and sub-step 1214. In sub-step 1212, the second base station is operated to use a second set of stored control channel structure information to control the transmission of at least some control signals according to a predetermined recurring transmission pattern. In sub-step 1214, the second base station is operated to generate symbol transmission timing control signals to control the duration of symbols transmitted by said second transmitter, the duration of symbols transmitted by said second transmitter being shorter than the duration of symbols transmitted by said first transmitter.

In some embodiments, the period of the recurring transmission pattern used by the first and second transmitters is different by an amount proportional to a difference in symbol transmission durations, where the difference in symbol transmission durations is the difference in the duration of symbol transmission times at said first transmitter to the duration of symbol transmission times at said second transmitter.

In various embodiments, the symbol duration of symbols transmitted by said first transmitter includes a cyclic prefix portion and a symbol body portion, and the symbol duration of symbols transmitted by said second transmitter are shorter than the duration of symbols transmitted by said first transmitter, and the ratio of i) the duration of the body portion of symbols transmitted by said first transmitter to ii) the duration of the body portion of symbols transmitted by said second transmitter is the same as the ratio of iii) the bandwidth of the second frequency band to iv) the bandwidth of the first frequency band. In some such embodiments, the ratio of the i) the duration of the cyclic prefix portion of symbols transmitted by said first transmitter to ii) the duration of the cyclic prefix portion of symbols transmitted by said second transmitter is also the same as the ratio of iii) the bandwidth of the second frequency band to iv) the bandwidth of the first frequency band.

In some embodiments, the ratio of i) the duration of the symbols transmitted by the first transmitter to ii) the duration of the symbols transmitted by the second transmitter is equal to the ratio of iii) the frequency spacing between two adjacent tones transmitted by said second transmitter to iv) the frequency spacing between two adjacent tones transmitted by said first transmitter. In some such embodiment the ratio is less than 1.3 to 1.

In some embodiments, one of the first and second transmitters operates in a portion of the a 2.5 GHz frequency band and the other one of said first and second transmitters operates in a portion of a 450 MHz frequency band.

In step 1206, base stations are operated to perform mobile node handoff operations and continue communications corresponding to ongoing communications sessions. Step 1206 includes sub-step 1216 and sub-step 1218. In sub-step 1216, the first base station is operated to complete a mobile node handoff operation to said second base station. In step 1218, the second base station is operated to transmit packets to said mobile node corresponding to a communications session that was ongoing at said first base station prior to said handoff.

In various embodiments, the same recurring control signaling pattern for uplink control signaling is used in each of the first and second base stations.

FIG. 13 is a table 1300 illustrating exemplary information corresponding to two exemplary base stations which are part of an exemplary communications system, implemented in accordance with the present invention. For example, the two base stations may be the first and second base station described with respect to the exemplary method described in FIG. 12, the base stations including stored downlink timing/frequency structure information such as to control implementation as described with respect to Table 13 and supporting handoffs of mobile nodes between the two base stations. First column 1302 describes each item listed in a row; second column 1304 includes base station 1 OFDM transmitter information; third column 1306 includes base station 2 OFDM transmitter information. First row 1308 describes that each base station uses 113 tones in its transmitter downlink tone block. Second row 1310 describes that the frequency band for the downlink tone block for the base station 1 OFDM transmitter downlink tone block is 1271.25 KHz while the frequency band for the base station 2 OFDM transmitter downlink tone block is 1525.50 KHz. Third row 1312 indicates that the frequency spectrum band in which the downlink tone block frequency band is a portion thereof is the 2.5 GHz band for the base station 1 OFDM transmitter and the 450 MHz band for the base station 2 OFDM transmitter. Fourth row 1314 indicates that the duration of an OFDM symbol is (800/9) microseconds or approximately 89 micro-seconds for base station 1 OFDM transmitter and is (800/10.8) microseconds or approximately 74 microseconds for base station 2 OFDM transmitter. Fifth row 1316 indicates that the duration of an OFDM symbol body portion is (800/9)(128/144) microseconds or approximately 79 micro-seconds for base station 1 OFDM transmitter and is (800/10.8)(128/144) microseconds or approximately 66 microseconds for base station 2 OFDM transmitter. Sixth row 1318 indicates that the duration of an OFDM symbol cyclic prefix portion is (800/9)(16/144) microseconds or approximately 9.9 micro-seconds for base station 1 OFDM transmitter and is (800/10.8)(16/144) microseconds or approximately 8.2 microseconds for base station 2 OFDM transmitter. Seventh row 1320 indicates that the frequency spacing between adjacent tones is 11.25 KHz for the base station 1 OFDM transmitter and 13.5 KHz for the base station 2 OFDM transmitter. Eighth row 1322 indicates that the repetitive downlink time structure, e.g., a superultra slot of 131328 consecutive OFDM symbol duration time periods is 11.6736 seconds for the base station 1 OFDM transmitter and 9.728 seconds for the base station 2 OFDM transmitter.

Figure 14A:
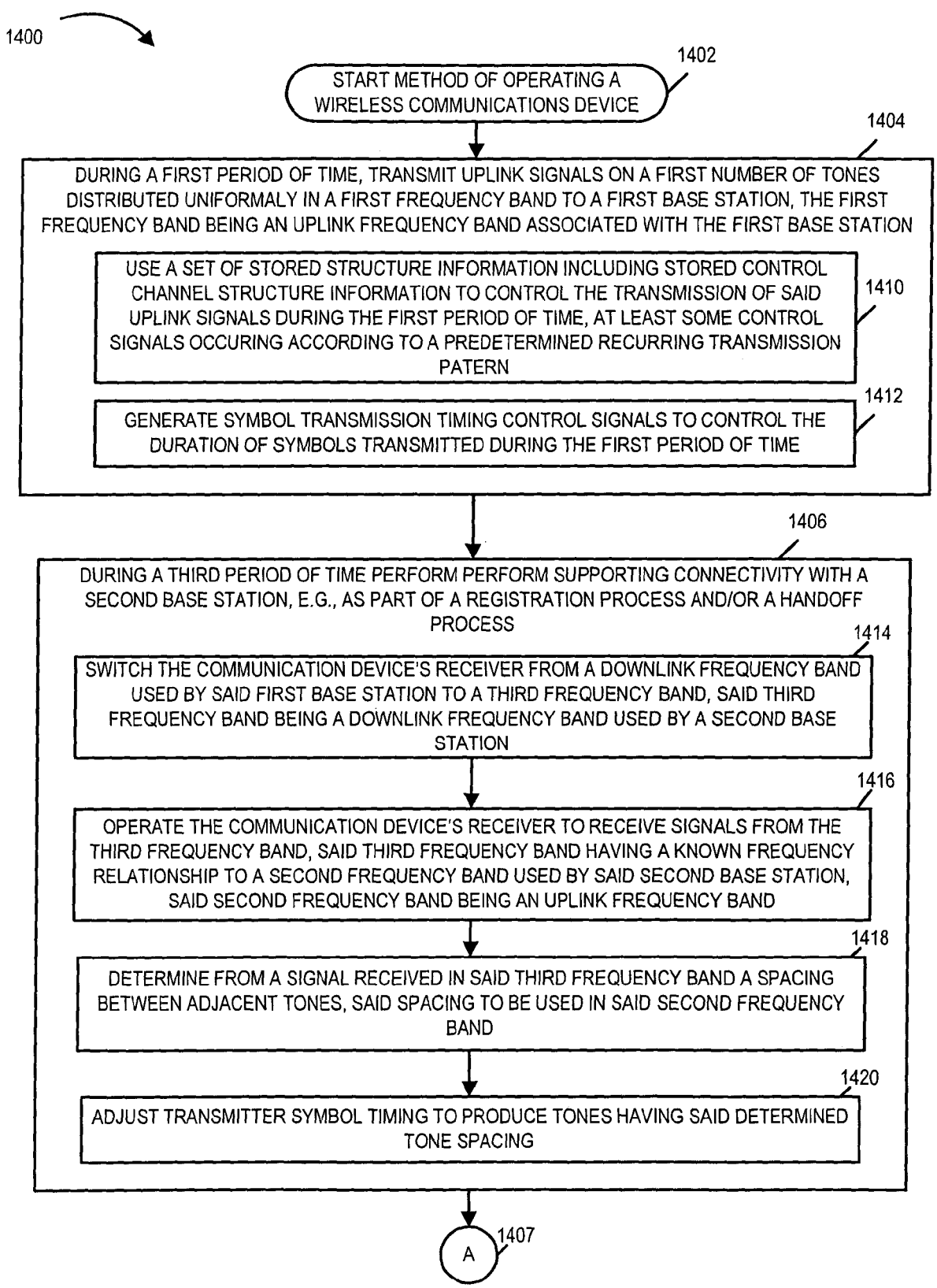
FIG. 14, which comprises the combination of FIG. 14A and FIG. 14B, is a flowchart of an exemplary method of operating a wireless communications device in accordance with the present invention.
Figures 14, 14A, 14B:
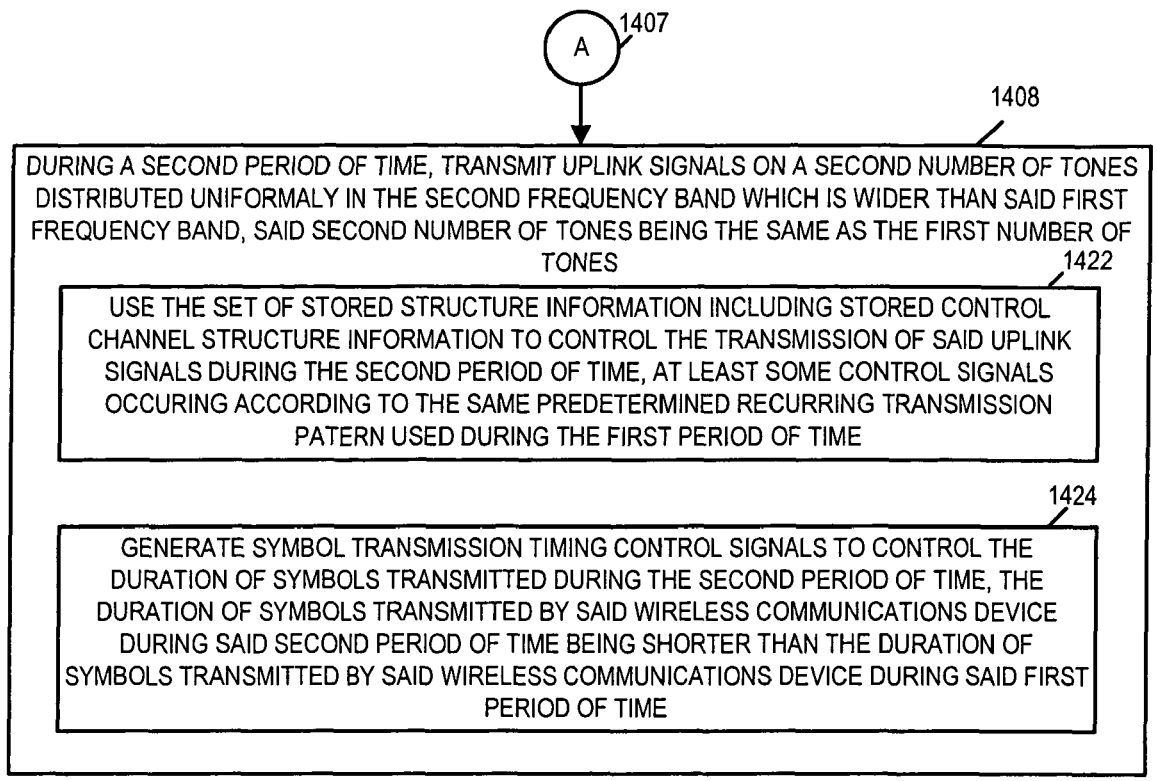

FIG. 14, which comprises the combination of FIG. 14A and FIG. 14B, is a flowchart of an exemplary method of operating a wireless communications device in accordance with the present invention. For example, the wireless communications device may be a wireless terminal, e.g., mobile node, in an exemplary OFDM spread spectrum multiple access wireless communications system. The exemplary method starts in step 1402, where the wireless communication device has been powered on, initialized and established a wireless communications link with a first base station. Operation proceeds from step 1402 to step 1404.

In step 1404, the wireless communications device is operated, during a first period of time, to transmit uplink signals on a first number of tones distributed uniformly in a first frequency band to a first base station, the first frequency band being an uplink frequency band associated with the first base station. In some embodiments, the first number of tones is at least ten. In some embodiments, the first number of tones is 113. In some embodiments, the uplink signals transmitted during said first period of time are OFDM symbols. For example, an OFDM symbol may include the set of uplink tones of the first frequency band, e.g., a set of 113 contiguous uniformly distributed tones. Continuing with the example, for the communications device, for a given uplink OFDM symbol transmitted, the wireless communications device may have been allocated a sub-set of the tones on which to place modulation symbols having a non-zero energy level, while on the other tones no energy is placed. For example, the sub-set of tones may include a dedicated control channel tone and, at times, additional tones, e.g., 14 tones associated with a traffic channel segment. In this way, for a given OFDM symbol transmission time period, the set of uplink tones in the first band can be partitioned among a plurality of wireless communications devices. Continuing with the example, consider that the uplink tones of the first frequency band are frequency hopped in accordance with an uplink tone hopping sequence. If the wireless communications device is allocated one pre-hopping logical tone for a dedicated control channel, over time, the logical tone will correspond to different ones of the physical tones in the first frequency band. In this way, over the first time period the wireless communications device uses the set of tones of the first frequency band.

Step 1404 includes sub-step 1410 and sub-step 1412. In sub-step 1410, the wireless communications device is operated to use a set of stored structure information including stored control channel structure information to control the transmission of said uplink signals during the first period of time, at least some control signals occurring according to a predetermined recurring transmission pattern. In sub-step 1412, the wireless communications device is operated to generate symbol transmission timing control signals to control the duration of symbols transmitted during the first period of time.

Operation proceeds from step 1404 to step 1406. In step 1406, during a third period of time, the wireless communications device is operated to perform operations supporting connectivity with a second base station, e.g., as part of a registration process and/or a handoff process. Step 1406 includes sub-steps 1414, 1416, 1418, and 1420. In sub-step 1414, the wireless communications device is operated to switch its receiver from a downlink frequency band used by said first base station, e.g., a fourth frequency band, to a third frequency band, said third frequency band being a downlink frequency band used by a second base station. Operation proceeds from sub-step 1414 to sub-step 1416. In sub-step 1416, the wireless communication device's receiver is operated to receive signals from the third frequency band, said third frequency band having a known frequency relationship to a second frequency band used by said second base station, said second frequency band being an uplink frequency band. In some embodiments, the received signals from the third frequency band include at least one high power beacon signal. In some such embodiments, the beacon signal includes at most two tones and is transmitted at a power level at least twice as high as the highest power level used by either of the first or second base stations to transmit user data. In some embodiments, the beacon signal is a narrowband signal. Operation proceeds from sub-step 1416 to sub-step 1418. In sub-step 1418, the wireless communications device determines from a signal received in said third frequency band, e.g., the beacon signal, a spacing between adjacent tones, said spacing to be used in said second frequency band. Operation proceeds from sub-step 1418 to sub-step 1420. In sub-step 1420, the wireless communications device is operated to adjust transmitter symbol timing to produce tones having said determined tone spacing.

Operation proceeds from step 1406, via connecting node A 1407, to step 1408. In step 1408 the wireless communications device is operated during a second period of time to transmit uplink signals, e.g., OFDM symbols, on a second number of tones distributed uniformly in the second frequency band which is wider than the first frequency band, said second number of tones being the same as the first number of tones. Step 1408 includes sub-step 1422 and sub-step 1424.

In sub-step 1422 the wireless communications device is operated to use the set of stored structure information including stored control channel structure information to control the transmission of said uplink signals during the second period of time, at least some control signals occurring according to the same predetermined recurring transmission pattern used during the first period of time. In some embodiments, the period of the recurring transmission pattern used during said first and second time periods is different by an amount proportional to the ratio of i) the bandwidth of the second frequency band to ii) the bandwidth of the first frequency band.

In sub-step 1424, the wireless communications device is operated to generate symbol transmission timing control signals to control the duration of symbols transmitted during the second period of time, the duration of symbols transmitted by said wireless communications device during said second period of time being shorter than the duration of symbols transmitted by said wireless communications device during said first period of time.

In various embodiments, the symbol duration of symbols transmitted by said wireless communications device during said first time period includes a cyclic prefix portion and a symbol body portion, and the symbol duration of symbols transmitted by said wireless communications device during said second period of time are shorter than the duration of symbols transmitted by wireless communications device during said first period, and the ratio of i) the duration of the body portion of symbols transmitted during said first period of time to ii) the duration of the body portion of symbols transmitted during said second period of time is the same as the ratio of iii) the bandwidth of the second frequency band to iv) the bandwidth of the first frequency band. In some such embodiments, the ratio of the i) the duration of the cyclic prefix portion of symbols transmitted during said first period of time to ii) the duration of the cyclic prefix portion of symbols transmitted during said second period of time is also the same as the ratio of iii) the bandwidth of the second frequency band to iv) the bandwidth of the first frequency band.

In some embodiments, the ratio of i) the duration of the symbols transmitted during said first period of time to ii) the duration of the symbols transmitted during the second period of time is equal to the ratio of iii) the frequency spacing between two adjacent tones transmitted during said second period of time to iv) the frequency spacing between two adjacent tones transmitted during said first period of time. In some such embodiment the ratio is less than 1.3 to 1, e.g. 1.2 to 1.

In some embodiments, one of the first and second frequency bands is in a portion of the a 2.5 GHz frequency band and the other one of said first and second frequency bands is in a portion of a 450 MHz frequency band.

Figure 15:
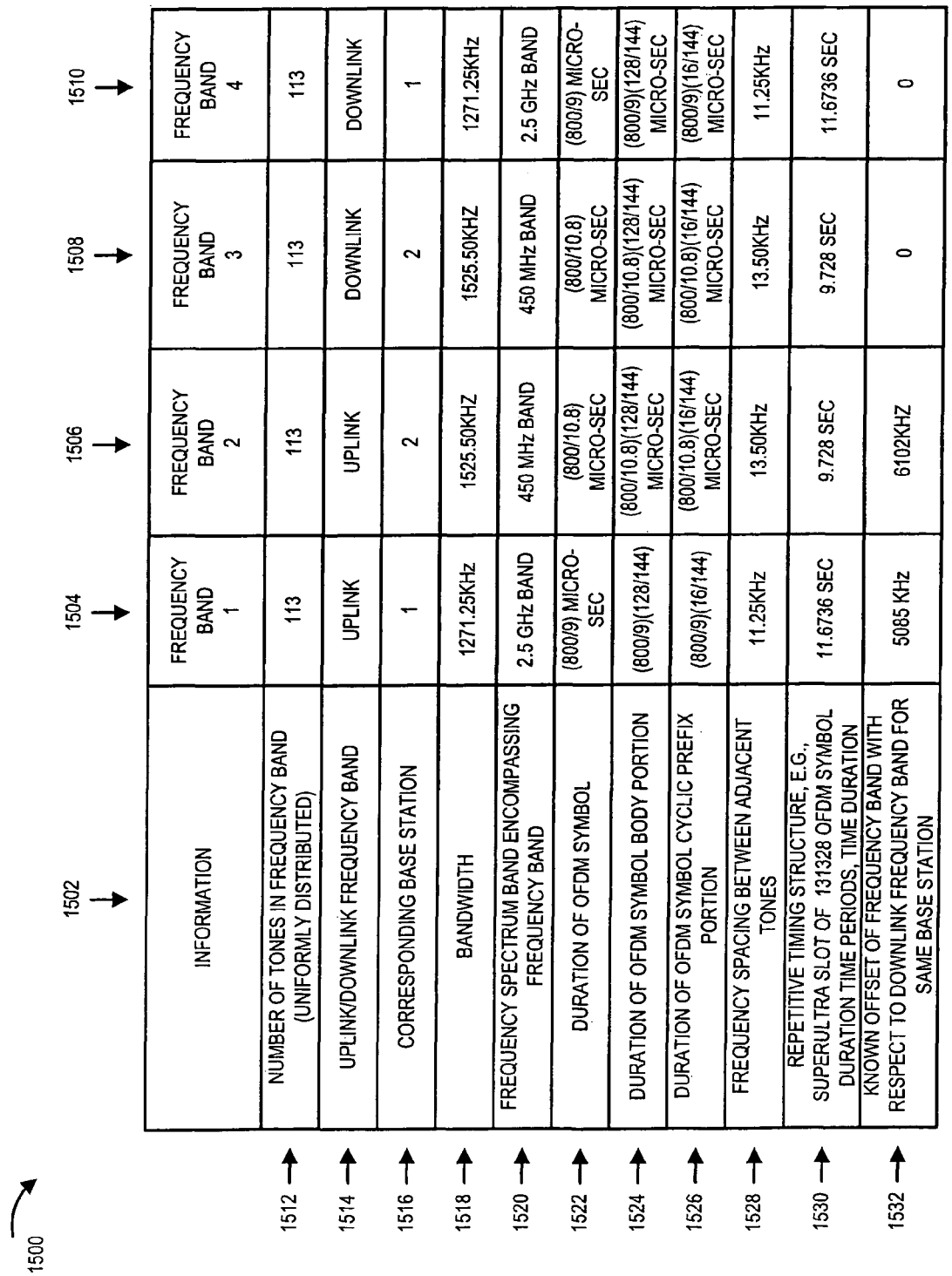
FIG. 15 is a table illustrating exemplary information corresponding to four exemplary frequency bands which are part of an exemplary communications system, implemented in accordance with the present invention, the four exemplary frequency bands being used by the same exemplary wireless terminal implemented in accordance with the present invention.

FIG. 15 is a table 1500 illustrating exemplary information corresponding to four exemplary frequency bands which are part of an exemplary communications system, implemented in accordance with the present invention, the four exemplary frequency bands being used by the same exemplary wireless terminal implemented in accordance with the present invention. For example, the frequency bands may be exemplary frequency bands described with respect to the exemplary method described in FIG. 14, the wireless communications device including stored timing/frequency structure information such as to control implementation as described with respect to Table 15 and support registration operations at each of the base stations, support communications links to each of the base stations, and support handoffs of the communications device between the two base stations.

First column 1502 describes each item listed in a row; second column 1504 includes frequency band 1 information; third column 1506 includes frequency band 2 information; fourth column 1508 includes frequency band 3 information; fifth column 1510 includes frequency band 4 information. First row 1512 describes that each frequency band uses 113 uniformly distributed tones. Second row 1514 describes that the frequency bands 1 and 2 are uplink frequency bands while frequency bands 3 and 4 are downlink frequency bands. Third row 1516 identifies that frequency bands 1 and 4 correspond to base station 1, while frequency bands 2 and 3 correspond to base station 2. Fourth row 1518 identifies that the bandwidth associated with frequency bands 1 and 4 is 1271.25 KHz, while the bandwidth associated with frequency bands 2 and 3 is 1525.50 KHz. Fifth row 1520 identifies that the frequency spectrum band encompassing band 1 and band 4 is the 2.5 GHz band, while the frequency spectrum band encompassing bands 2 and 3 is the 450 MHz band. In some embodiments, the frequency spectrum band used for a particular base station is a function of geographic location, country, government regulations, and/or licensing agreements. Seventh row 1522 indicates that the duration of an OFDM symbol is (800/9) microseconds or approximately 89 micro-seconds for frequency bands 1 and 4 and is (800/10.8) microseconds or approximately 74 microseconds for frequency bands 2 and 3. Eighth row 1526 indicates that the duration of an OFDM symbol body portion is (800/9)(128/144) microseconds or approximately 79 micro-seconds for frequency bands 1 and 4 and is (800/10.8)(128/144) microseconds or approximately 66 microseconds for frequency bands 2 and 3. Ninth row 1528 indicates that the duration of an OFDM symbol cyclic prefix portion is (800/9)(16/144) microseconds or approximately 9.9 micro-seconds for frequency bands 1 and 4 and is (800/10.8)(16/144) microseconds or approximately 8.2 microseconds for frequency bands 2 and 3. Tenth row 1530 indicates that the frequency spacing between adjacent tones is 11.25 KHz for frequency band 1 and frequency band 4 and 13.5 KHz for frequency band 2 and frequency band 3. Eleventh row 1530 indicates that the repetitive timing structure, e.g., a superulta slot of 131328 consecutive OFDM symbol duration time periods, is 11.6736 seconds for frequency bands 1 and 4 and 9.728 seconds for frequency bands 2 and 3. Twelfth row 1532 indicates that there is a known offset of 5085 KHz of uplink frequency band 1 with respect to downlink frequency band 4, and there is a known offset of 6102 KHz of uplink frequency band 2 with respect to downlink frequency band 3.

Figure 16:
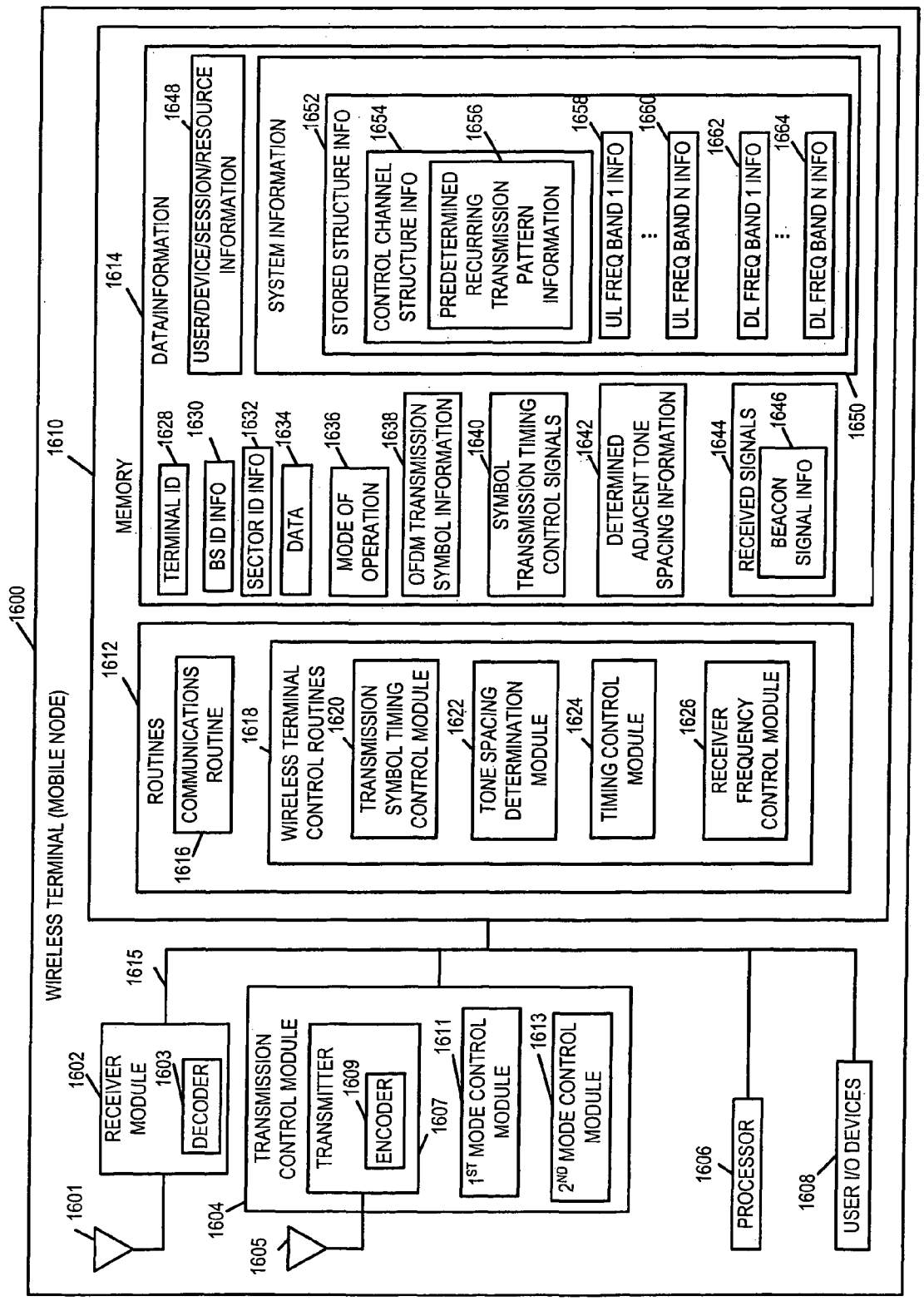
FIG. 16 is a drawing of an exemplary wireless terminal, e.g., mobile node, implemented in accordance with the present invention and using methods of the present invention.

FIG. 16 is a drawing of an exemplary wireless terminal 1600, e.g., mobile node, implemented in accordance with the present invention and using methods of the present invention. Exemplary wireless terminal 1600 includes a receiver module 1602, a transmission control module 1604, a processor 1606, user I/O devices 1608, and a memory 1610 coupled together via a bus 1615 via which the various elements can interchange data and information. Receiver module 1602 is coupled to a receive antenna 1601 via which the wireless terminal 1600 receives downlink signals from base stations. Receiver module 1602 includes a decoder 1603 which decodes received downlink signals which had been encoded by a base station prior to transmission. Receiver module 1602 receives downlink signals from a downlink frequency band to which it is controllably set, e.g., a third frequency band used by a second base station.

Transmission control module 1604 includes a transmitter 1607, a $1^{st}$ mode control module 1611, and a $2^{nd}$ mode control module 1613. The transmission control module 1604 controls the wireless terminal 1600 to operate in different modes of operation using tones of different widths during the different modes of operation. Transmitter 1607 is coupled to transmit antenna 1605 via which the wireless terminal transmits uplink signals to base stations. In some embodiments, the same antenna is used for both receiver and transmitter. Transmitter 1607 includes an encoder 1609 for encoding data/information prior to transmission. $1^{st}$ mode control module 1611 controls transmission operation during a first mode of operation, the $1^{st}$ mode control module 1611 controlling the transmitter 1607 to transmit signals on a first number of tones distributed uniformly in a first frequency band. $2^{nd}$ mode control module 1613 controls transmission operation during the second mode of operation, the $2^{nd}$ mode control module 1613 controlling the transmitter 1607 to transmit signals on a second number of tones distributed uniformly in a second frequency band which is wider than said first frequency band, the second number of tones being the same as the first number of tones. In some embodiments, the first number of tones is at least 10. In some embodiments the first number of tones is 113 tones. The uplink signals transmitted during the first and second modes of operation are, in various embodiments, OFDM symbols. For example, each OFDM symbol may be represented by OFDM symbol transmission information 1638.

Memory 1610 includes routines 1612 and data/information 1614. The processor 1606, e.g., a CPU, executes the routines 1612 and uses the data/information 1614 in memory 1610 to control the operation of the wireless terminal 1600 and implement the methods of the present invention. User I/O devices 1608, e.g., microphone, speaker, keyboard, keypad, display, camera, switches, etc., provide a user interface for the user of wireless terminal 1600 to enter data/information, to output data/information, to control various applications, and to operate various functions and features, e.g., power on the wireless terminal, initiate a communications session, etc.

Routines 1612 includes a communications routine 1616 and wireless terminal control routines 1618. Communications routine 1616 implements the various communications protocols used by the wireless terminal 1600. The wireless terminal control routines 1618 include a transmission symbol timing control module 1620, a tone spacing determination module 1622, a timing control module 1624, and a receiver frequency control module 1626.

Transmission symbol timing control module 1620 generates symbol transmission timing control signals 1640 used to control the duration of symbols transmitted during said first and second modes of operation, e.g., during first and second periods of time, respectively. In various embodiments, each symbol duration includes a cyclic prefix portion and a symbol body portion and the ratio of i) the duration of the body portion of symbols transmitted during the first period of time to ii) the duration of the body portion of symbols transmitted during the second period of time is controlled to be the same as the ratio of iii) the bandwidth of the second frequency band to iv) the bandwidth of the first frequency band. In various embodiments, the control signals 1640 generated by module 1620 control the duration of symbols transmitted during the second mode of operation to be shorter than the duration of symbols transmitted by the wireless terminal 1600 during the first period of time. In some such embodiments, the ratio of the duration of the symbols transmitted during the first mode of operation to the duration of the symbols transmitted during the second mode of operation is controlled to be equal to the ratio of the iii) the frequency spacing between two adjacent tones transmitted during the second mode of operation to iv) the frequency spacing between two adjacent tones transmitted during the first mode of operation. In some such embodiments, the ratio is less than 1.3 to 1, e.g., 1.2 to 1. In some embodiments, one of the first and second frequency bands is in a portion of a 2.5 GHz frequency band and the other one of the first and second frequency bands is in a portion of a 450 MHz frequency band. In some embodiments, the first mode of operation corresponds to a time period in which the wireless terminal communicates with a first base station, while the second mode of operation corresponds to a time period during which the wireless terminal communicates with a second base station which is different from the first base station.

Tone spacing determination module 1622 determines, using information from a received downlink signal, a tone spacing to be used. Tone spacing determination module 1622 determines from a signal, e.g., a beacon signal, received in a third frequency band a spacing between adjacent tones 1642 to be used in the second frequency band, the third frequency band being a downlink frequency band used by the second base station and having an known frequency relationship to the second frequency band. Timing control module 1624 adjusts transmitter symbol timing to produce tones having the determined tone spacing.

Receiver frequency control module 1626 switches receiver 1602 to change between downlink frequency bands. For example, receiver frequency control module 1626 switches receiver module 1602 from a downlink frequency band used by the first base station, e.g., a fourth frequency band, to the downlink frequency band used by the second base station, the third frequency band, prior to operating the receiver to receive signals from the third frequency band. In various embodiments, the received signals 1644 include beacon signals 1646.

Data/information 1614 includes a terminal identifier 1628, base station identification information 1630, sector identification information 1632, data 1634, mode of operation 1636, OFDM transmission symbol information 1638, symbol transmission timing control signals 1640, determined adjacent tone spacing information 1642, and received signals 1644 including beacon signal information 1646. In some embodiments, the beacon signals are high power narrowband signals, e.g., a narrowband signal including one or at most two tones and having a transmission power level at least twice as high as the highest power level used by either the first or second base stations to transmit user data. Terminal ID 1628 is, e.g., a base station assigned wireless terminal identifier or identifiers, e.g., an active user identifier. Base station identification information 1630 includes information identifying the base stations which the WT 1600 is using as an attachment point. Sector ID information 1632 includes information identifying the base station sector being used as an attachment point. Mode of operation 1636 identifies the current mode of operation of the WT 1600, e.g., a first mode in which uplink signals are controlled by $1^{st}$ mode control module 1611 having a first tone spacing and OFDM transmission symbol duration or a second mode in which uplink signals are controlled by $2^{nd}$ mode control module 1613 having a second tone spacing and OFDM symbol transmission time duration. Data/information 1614 also includes user/device/session/resource information 1648 and system information 1650. User/device/session/resource information 1648 includes user device information, information pertaining to a peer node in a communications session with WT 1600, routing information, and resource information, e.g., uplink and downlink segments assigned to WT 1600. System information 1650 includes stored structure information 1652. Stored structure information 1652 includes control channel structure information 1654, a plurality of sets of uplink frequency band information (UL frequency band 1 information 1658, . . . , UL frequency band N information 1660), and a plurality of sets of downlink frequency band information (downlink frequency band 1 information 1662, . . . , downlink frequency band N information 1664). Control channel structure information 1654 includes predetermined recurring transmission pattern information 1656. Control channel structure information 1654 is used to control the transmission of signals during the first and second modes of operation, at least some control signals occurring according to a predetermined recurring transmission pattern, represented by information 1656, which is the same for both first and second modes of operation. In some embodiments, the period of the recurring transmission pattern used during the first and second modes of operation is different by an amount proportional to the ratio of i) the bandwidth of the second frequency band to ii) the bandwidth of the first frequency band.

Figure 17:
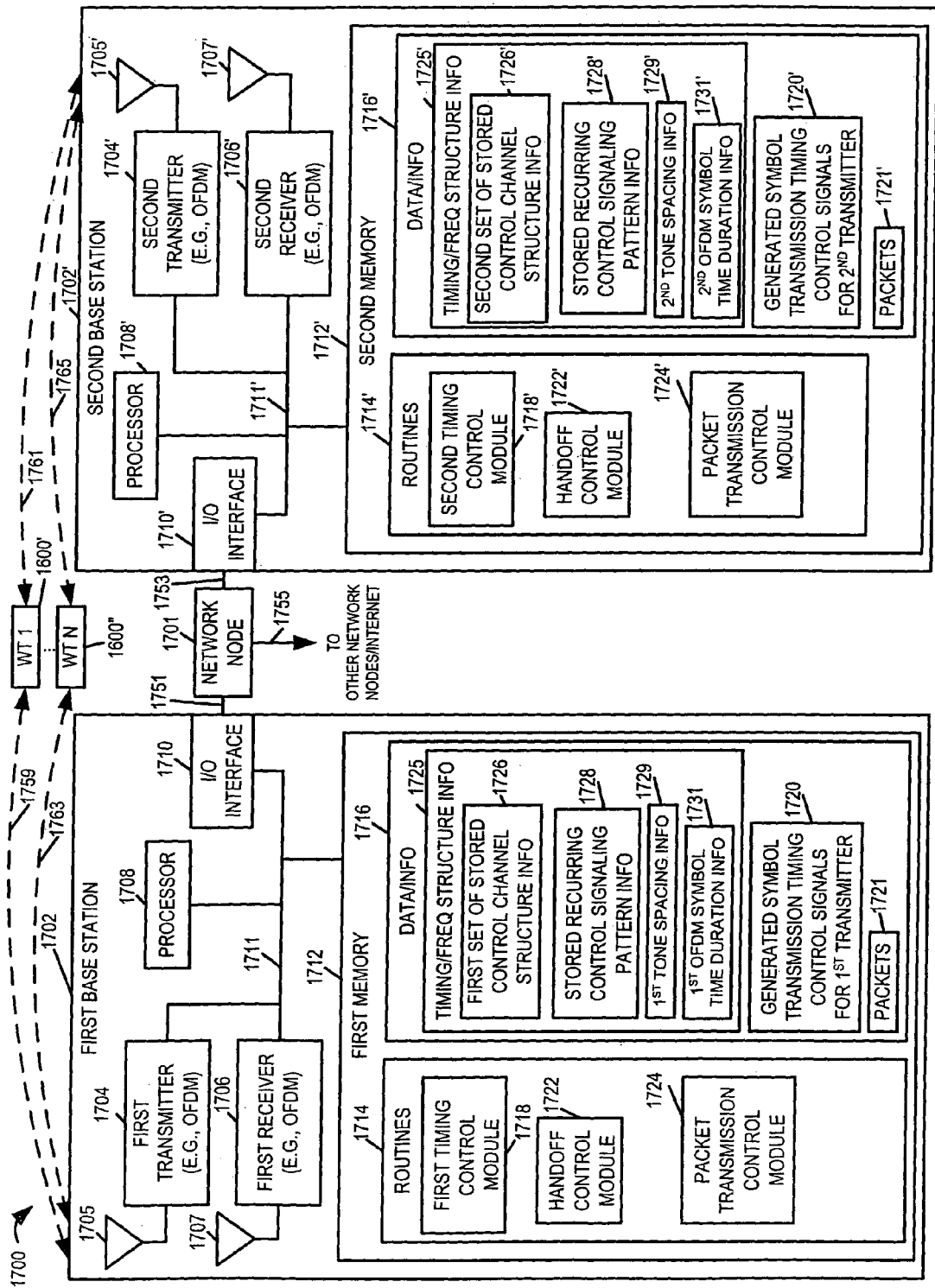
FIG. 17 is a drawing of an exemplary communications system implemented in accordance with the present invention and using methods of the present invention.

FIG. 17 is a drawing of an exemplary communications system 1700 implemented in accordance with the present invention and using methods of the present invention. Exemplary communications system 1700 is, e.g., an exemplary OFDM spread spectrum multiple access wireless communications system. Exemplary system 1700 includes a plurality of base stations (first base station 1702, second base station 1702') coupled together. First base station 1702 and second base station 1702' are coupled to network node 1701, e.g., a router, via network links 1751, 1753, respectively. At least some of the base stations in the system 1700 operate using different OFDM tone spacing and different OFDM symbol transmission time periods. At least some of the WTs in the system 1700 are capable of supporting operation with base stations using different OFDM tone spacing and OFDM symbol timing periods. In some embodiments, some such WTs participate in handoff operations between base stations using different tone spacing and OFDM transmission time periods, e.g., with the WT adjusting its timing/frequency to match the timing/frequency structure of the particular base station. Network node 1701 is coupled to other network nodes and/or the Internet via network link 1755. Network links 1751, 1753, 1755 are, e.g., fiber optic links. Exemplary system 1700 also includes a plurality of wireless terminals (WT 1 1600', . . . , WT N 1600"). WTs (1600', 1600"), in some embodiments, may be represented by exemplary WT 1600 of FIG. 16. WT 1 1600', when coupled to first base station 1702, is coupled via wireless link 1759. WT 1 1600', when coupled to second base station 1702', is coupled via wireless link 1761. WT N 1600", when coupled to first base station 1702, is coupled via wireless link 1763. WT N 1600", when coupled to second base station 1702', is coupled via wireless link 1765.

First base station 1702 includes a first transmitter 1704, e.g., an OFDM transmitter, a first receiver 1706, e.g., an OFDM transmitter, a processor 1708, e.g., a CPU, I/O interface 1710, and first memory 1712 coupled together via bus 1711 over which the various elements interchange data and information.

First transmitter 1704 is coupled to a transmit antenna 1705 through which it transmits downlink signals to wireless terminals. First transmitter 1704 transmits downlink signals on a first number of tones distributed uniformly in a first frequency band. In some embodiments, the first number of tones is at least 10 tones. In some embodiments the first number of tones is 113 tones.

First receiver 1706 is coupled to a receive antenna 1707 via which the first base station 1702 receives uplink signals from a plurality of wireless terminals. The first receiver 1706 uses a set of uplink tones, e.g., 113 uplink tones distributed uniformly in a fourth frequency band. In this exemplary embodiment, there is a fixed relationship between the first frequency band used for the set of downlink tones and the fourth frequency band used for the set of uplink tones, and the two sets are non-overlapping. However, the first and fourth frequency bands form a portion of a larger frequency band, e.g., a 2.5 GHz frequency band.

I/O interface 1710 couples the first base station 1702 to other network nodes and/or the Internet. I/O interface 1710 provides backhaul connectivity such that a wireless terminal using first base station 1702 as its network attachment point can communicate with a peer node using a different base station as its point of network attachment.

First memory 1712 includes routines 1714 and data/information 1716. Processor 1708 executes the routines 1714 and uses the data/information 1716 in first memory 1712 to control the operation of the first base station 1702 and implement methods of the present invention.

Routines 1714 includes a first timing control module 1718, a handoff control module 1722, and a packet transmission control module 1724. Data/information 1716 includes timing/frequency structure information 1725 and generated symbol transmission timing control signals for $1^{st}$ transmitter 1720. Timing frequency structure information 1725 includes a first set of stored control channel structure information 1726, stored recurring control signal pattern information 1728, $1^{st}$ tone spacing information 1729, and $1^{st}$ OFDM symbol time duration information 1731. Data/information 1721 also includes packets 1721, e.g., packets including user data such as voice data, text data, image data, file data, etc., to be communicated between wireless terminals as part of a communications session.

The first set of stored control channel structure information 1726 is used for controlling the transmission by the first transmitter 1704 of at least some control signals, e.g., including beacons and pilot signals, according to a predetermined recurring transmission pattern identified in stored recurring control signaling pattern information 1728. $1^{st}$ tone spacing information 1729 includes information identifying the OFDM tone spacing used by said first transmitter 1704 and said first receiver 1706. $1^{st}$ OFDM symbol time duration information 1731 includes information identifying the duration of an OFDM symbol used by the first transmitter 1704 and the first receiver 1706.

The first timing control module 1718 generates symbol transmission timing control signals to control the duration of symbols transmitted by the first transmitter 1704, the symbol duration includes a cyclic prefix portion and a symbol body portion. Handoff control module 1722 is used for implementing handoffs of wireless terminals from/to other base stations. Some of the other base stations, e.g., second base station 1702', use different OFDM tone spacing/OFDM symbol time duration than the first base station 1702 uses. Handoff control module 1722 controls the first base station to complete a wireless terminal, e.g., mobile node, handoff to second base station 1702'. Packet transmission control module 1724 controls the first base station to transmit packets, e.g., packets 1721, to a mobile node.

Second base station 1702' includes a second transmitter 1704', e.g., an OFDM transmitter, a second receiver 1706', e.g., an OFDM transmitter, a processor 1708', e.g., a CPU, I/O interface 1710', and second memory 1712' coupled together via bus 1711' over which the various elements interchange data and information.

Second transmitter 1704' is coupled to a transmit antenna 1705' through which it transmits downlink signals to wireless terminals. Second transmitter 1704' transmits downlink signals on a second number of tones distributed uniformly in a second frequency band, the second frequency band being wider than the first frequency band used by the first base station 1702, the second number of tones being the same as the first number of tones used by the first base station 1702.

Second receiver 1706' is coupled to a receive antenna 1707' via which the second base station 1702' receives uplink signals from a plurality of wireless terminals. The second receiver 1706' uses a set of uplink tones, e.g., 113 uplink tones distributed uniformly in a third frequency band. In this exemplary embodiment, there is a fixed relationship between the second frequency band used for the set of downlink tones and the third frequency band used for the set of uplink tones, and the two sets are non-overlapping. However, the second and third frequency bands form a portion of a larger frequency band, e.g., a 450 MHz frequency band.

I/O interface 1710' couples the second base station 1702' to other network nodes and/or the Internet. I/O interface 1710' provides backhaul connectivity such that a wireless terminal using second base station 1702' as its network attachment point can communicate with a peer node using a different base station as its point of network attachment.

Second memory 1712' includes routines 1714' and data/information 1716'. Processor 1708' executes the routines 1714' and uses the data/information 1716' in second memory 1712' to control the operation of the second base station 1702' and implement methods of the present invention.

Routines 1714' includes a second timing control module 1718', a handoff control module 1722', and a packet transmission control module 1724'. Data/information 1716' includes timing/frequency structure information 1725' and generated symbol transmission timing control signals for $2^{nd}$ transmitter 1720'. Timing frequency structure information 1725' includes a second set of stored control channel structure information 1726', stored recurring control signal pattern information 1728', $2^{nd}$ tone spacing information 1729', and $2^{nd}$ OFDM symbol time duration information 1731'. Data/information 1721' also includes packets 1721', e.g., packets including user data such as voice data, text data, image data, file data, etc., to be communicated between wireless terminals as part of a communications session.

The second set of stored control channel structure information 1726' is used for controlling the transmission by the second transmitter 1704' of at least some control signals, e.g., including beacons and pilot signals, according to a predetermined recurring transmission pattern identified in stored recurring control signaling pattern information 1728'. $2^{nd}$ tone spacing information 1729' includes information identifying the OFDM tone spacing used by said second transmitter 1704' and said second receiver 1706'. $2^{nd}$ OFDM symbol time duration information 1731' includes information identifying the duration of an OFDM symbol used by the second transmitter 1704' and the second receiver 1706'.

The second timing control module 1718' generates symbol transmission timing control signals to control the duration of symbols transmitted by the second transmitter 1704', the symbol duration includes a cyclic prefix portion and a symbol body portion. Handoff control module 1722' is used for implementing handoffs of wireless terminals from/to other base stations. Some of the other base stations, e.g., first base station 1702, use different OFDM tone spacing/OFDM symbol time duration than the second base station 1702' uses. Handoff control module 1722' controls the second base station to complete a wireless terminal, e.g., mobile node, handoff from first base station 1702.

Packet transmission control module 1724' controls the second base station to transmit packets, e.g., packets 1721', to a mobile node. For example, the packets transmitted to said mobile node may correspond to a communications session that was ongoing at said first base station 1702 prior to the handoff to the second base station 1702'.

In some embodiments, the period of the recurring transmission pattern used for the first and second transmitters (1704, 1704') is different by an amount proportional to a difference in symbol transmission time durations, where the difference in symbol transmission durations is the difference in the duration of symbol transmission times at the first transmitter 1704 to the duration of symbol transmission times at the second transmitter 1704'. In some embodiments, the stored recurring control signaling pattern information (1728, 1728') includes information used for uplink control signaling.

In some embodiment, the first and second timing control modules (1718, 1718') control transmission symbol timing such that the duration of symbols transmitted by the second transmitter 1704' are shorter than the duration of symbols transmitted by the first transmitter 1704, and the ratio of i) the duration of the body portion of symbols transmitted by the first transmitter 1704 to ii) the duration of the body portion of symbols transmitted by the second transmitter 1704' is the same as the ratio of iii) the bandwidth of the second frequency band to iv) the bandwidth of the first frequency band. In some such embodiments, the first and second timing control modules (1718, 1718') control transmission symbol timing such that the duration of the cyclic prefix portion of symbols transmitted by the first transmitter 1704 to ii) the duration of the cyclic prefix portion of symbols transmitted by the second transmitter 1704' is the same as the ratio of iii) the bandwidth of the second frequency band to iv) the bandwidth of the first frequency band.

In some embodiment, the ratio of i) the duration of symbols transmitted by the first transmitter 1704 to ii) the duration of symbols transmitted by the second transmitter 1704' is equal to the ratio of iii) the frequency spacing between two adjacent tones transmitted by the second transmitter 1704' to iv) the frequency spacing between two adjacent tones transmitted by the first transmitter 1704. In some such embodiments the ratio is less than or equal to 1.3 to 1, e.g., 1.05 to 1 or 1.1 to 1 or 1.2 to 1.

In some embodiments, there are a plurality of base stations using a first OFDM tone spacing and OFDM symbol time duration, and a plurality of base stations using a second OFDM tone spacing and OFDM symbol time duration.

In FIG. 17 exemplary embodiment, it is illustrated that the first and second transmitters (1704, 1704'), using different tone spacing and OFDM symbol durations, are each located in different base stations. In some embodiments, the first and second transmitters are located in the same base station. For example, the first transmitter may correspond to a first base station sector and the second transmitter may correspond to a second base station sector, the second base station sector being different from the first base station sector but belonging to the same base station. As another example, the first transmitter and the second transmitter may both correspond to the same base station sector of the same base station, but may correspond to different carrier frequencies.

Features of the invention can be implemented using one or more modules. Modules used to implement the invention can be implemented using software, hardware or as a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more communications network nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless communication device, comprising:
   during a first period of time:
      i) transmitting signals on a first number of tones distributed uniformly in a first frequency band; and
   during a second period of time:
      ii) transmitting signals on a second number of tones distributed uniformly in a second frequency band which is wider than said first frequency band, said second number of tones being the same as said first number of tones.

2. The method of claim 1, wherein said first number of tones is at least 10.

3. The method of claim 2, wherein said signals transmitted during said first and second time periods are OFDM symbols.

4. The method of claim 1, further comprising:
   using a set of stored structure information including control channel structure information to control the transmission of said signals during said first and second time periods, at least some control signals occurring according to a predetermined recurring transmission pattern which is the same for both said first and second time periods.

5. The method of claim 4, wherein the period of the recurring transmission pattern used during said first and second time periods is different by an amount proportional to the ratio of i) the bandwidth of the second frequency band to ii) the bandwidth of the first frequency band.

6. The method of claim 4, further comprising:
   generating symbol transmission timing control signals used to control the duration of symbols transmitted during said first period of time; and
   generating symbol transmission timing control signals used to control the duration of symbols transmitted during said second period of time, the duration of symbols transmitted during said second period of time being shorter than the duration of symbols transmitted by said during said first period of time.

7. The method of claim 6, wherein the ratio of i) the duration of the symbols transmitted during said first period of time to ii) the duration of the symbols transmitted during said second period of time is equal to the ratio of iii) the frequency spacing between two adjacent tones transmitted during said second period of time to iv) the frequency spacing between two adjacent tones transmitted during said first period of time.

8. The method of claim 7, wherein said ratio is less than 1.3 to 1.

9. The method of claim 7, wherein said wireless communications device is a mobile node.

10. The method of claim 9, wherein the signals transmitted during said first and second time periods are OFDM symbols;
    wherein one of said first and second frequency bands is in a portion of a 2.5 GHz frequency band; and
    wherein the other one of said first and second frequency bands is in a portion of a 450 MHz frequency band.

11. The method of claim 9, wherein the first time period is a time period during which said wireless communications device communicates with a first base station; and
    wherein said second time period is a time period during which said wireless communications device communicates with a second base station which is different from said first base station.

12. The method of claim 1, further comprising:
    generating symbol transmission timing control signals used to control the duration of symbols transmitted during said first and second time periods, each symbol duration including a cyclic prefix portion and a symbol body portion; the ratio of i) the duration of the body portion of symbols transmitted during said first period of time to ii) the duration of the body portion of symbols transmitted during said second period of time being the same as the ratio of iii) the bandwidth of the second frequency band to iv) the bandwidth of the first frequency band.

13. The method of claim 12, wherein the ratio of i) the duration of the cyclic prefix portion of symbols transmitted during said first period of time to ii) the duration of the cyclic prefix portion of symbols transmitted during said second period of time is also the same as the ratio of iii) the bandwidth of the second frequency band to iv) the bandwidth of the first frequency band.

14. The method of claim 12, further comprising:
during a third period of time which occurs prior to said second period of time, performing the steps of:
operating a receiver to receive signals from a third band, said third band being a downlink frequency band used by said second base station and having a known frequency relationship to said second frequency band;
determining from a signal received in said third frequency band a spacing between adjacent tones, said spacing to be used in said second frequency band; and
adjusting transmitter symbol timing to produce tones having said determined signal spacing.

15. The method of claim 14, wherein said third period of time occurs between said first and second periods of time, the method further comprising:
switching a receiver from a downlink frequency band used by said first base station to said third frequency band prior to operating the receiver to receive signals from the third band.

16. The method of 14, wherein said received signal includes at least one high power narrowband beacon signal.

17. The method of claim 16, wherein said narrowband beacon signal includes at most two tones and is transmitted at a power level at least twice as high as the highest power level used by either said first or second base station to transmit user data.

18. The method of claim 1, wherein tones in said second frequency band have a wider tone width than tones in said first frequency band.

19. A wireless communication terminal, comprising:
a transmission control module for controlling a wireless terminal to operate in different modes of operation using tones of different widths during the different modes of operation, the transmission control module including:
a transmitter;
a first mode control module for controlling transmission operation during said first mode of operation, said first mode control module controlling the transmitter to transmit signals on a first number of tones distributed uniformly in a first frequency band; and
a second mode control module for controlling transmission operation during said second mode of operation, said second mode control module controlling the transmitter to transmit signals on a second number of tones distributed uniformly in a second frequency band which is wider than said first frequency band, said second number of tones being the same as said first number of tones.

20. The wireless terminal of claim 19, wherein said first number of tones is at least 10.

21. The wireless terminal of claim 20, wherein said signals transmitted during said first and second time modes of operation are OFDM symbols.

22. The wireless terminal of claim 19, further comprising:
memory including a set of stored structure information including control channel structure information to control the transmission of said signals during said first and second modes of operation, at least some control signals occurring according to a predetermined recurring transmission pattern which is the same for both said first and second modes of operation.

23. The wireless terminal of claim 22, wherein the period of the recurring transmission pattern used during said first and second modes of operation is different by an amount proportional to the ratio of i) the bandwidth of the second frequency band to ii) the bandwidth of the first frequency band.

24. The wireless terminal of claim 22, further comprising:
a transmission symbol timing control module for generating symbol transmission timing control signals used to control the duration of symbols transmitted during said first and second modes of operation, said transmission timing control module generating symbol transmission timing control signals used to control the duration of symbols transmitted during said second mode of operation to be shorter than the duration of symbols transmitted by said wireless terminal during said first period of time.

25. The wireless terminal of claim 24, wherein the ratio of i) the duration of the symbols transmitted during said first mode of operation to ii) the duration of the symbols transmitted during said second mode of operation is equal to the ratio of iii) the frequency spacing between two adjacent tones transmitted during said second mode of operation to iv) the frequency spacing between two adjacent tones transmitted during said first mode of operation.

26. The wireless terminal of claim 25, wherein said ratio is less than 1.3 to 1.

27. The wireless terminal of claim 25, wherein said wireless terminal is a mobile node.

28. The wireless terminal of claim 27, wherein the signals transmitted during said first and second mode of operation are OFDM symbols;
wherein one of said first and second frequency bands is in a portion of a 2.5 GHz frequency band; and
wherein the other one of said first and second frequency bands is in a portion of a 450 MHz frequency band.

29. The wireless terminal of claim 27, wherein the first mode of operation corresponds to a time period during which said wireless terminal communicates with a first base station; and
wherein said second mode of operation corresponds to a time period during which said wireless terminal communicates with a second base station which is different from said first base station.

30. The wireless terminal of claim 29, further comprising:
a receiver module for receiving signals from a third band, said third band being a downlink frequency band used by said second base station and having a known frequency relationship to said second frequency band;
a tone spacing determination module for determining from a signal received in said third frequency band a spacing between adjacent tones, said spacing to be used in said second frequency band; and a timing control module for adjusting transmitter symbol timing to produce tones having said determined signal spacing.

31. The wireless terminal of claim 30, wherein said mode of operation occurs between said first and second modes of operation, the wireless terminal further comprising:
a receiver frequency control module for switching a receiver from a downlink frequency band used by said first base station to said third frequency band prior to operating the receiver to receive signals from the third band.

32. The wireless terminal of 30, wherein said received signal includes at least one high power narrowband beacon signal.

33. The wireless terminal of claim 32, wherein said narrowband beacon signal includes at most two tones having a transmission power level at least twice as high as the highest power level used by either said first or second base stations to transmit user data.

34. The wireless terminal of claim 19, further comprising:
a transmission symbol timing control module for generating symbol transmission timing control signals used to control the duration of symbols transmitted during said first and second modes of operation, each symbol duration including a cyclic prefix portion and a symbol body portion; the ratio of i) the duration of the body portion of symbols transmitted during said first period of time to ii) the duration of the body portion of symbols transmitted during said second period of time being the same as the ratio of iii) the bandwidth of the second frequency band to iv) the bandwidth of the first frequency band.

35. The wireless terminal of claim 34, wherein the ratio of i) the duration of the cyclic prefix portion of symbols transmitted during said first period of time to ii) the duration of the cyclic prefix portion of symbols transmitted during said second period of time is also the same as the ratio of iii) the bandwidth of the second frequency band to iv) the bandwidth of the first frequency band.

36. A wireless communication terminal, comprising:
means for controlling a wireless terminal to operate in different modes of operation using tones of different widths during the different modes of operation, said means for controlling including:
means for transmitting;
first mode control means for controlling transmission operation during said first mode of operation, said first mode control means for controlling control the means for transmitting to transmit signals on a first number of tones distributed uniformly in a first frequency band; and
second mode control means for controlling transmission operation during said second mode of operation, said second mode control means controlling said means for transmitting to transmit signals on a second number of tones distributed uniformly in a second frequency band which is wider than said first frequency band, said second number of tones being the same as said first number of tones.

37. The wireless terminal of claim 36, further comprising:
means for storing a set of stored structure information including control channel structure information to control the transmission of said signals during said first and second modes of operation, at least some control signals occurring according to a predetermined recurring transmission pattern which is the same for both said first and second modes of operation.

38. The wireless terminal of claim 36, further comprising:
means for generating symbol transmission timing control signals used to control the duration of symbols transmitted during said first and second modes of operation, each symbol duration including a cyclic prefix portion and a symbol body portion; the ratio of i) the duration of the body portion of symbols transmitted during said first period of time to ii) the duration of the body portion of symbols transmitted during said second period of time being the same as the ratio of iii) the bandwidth of the second frequency band to iv) the bandwidth of the first frequency band.

39. A non-transitory computer readable medium including computer executable instructions for controlling a wireless communication device, the non-transitory computer readable medium comprising:
instructions for causing said communication device to transmit signals, during a first period of time, on a first number of tones distributed uniformly in a first frequency band; and
instructions for causing said communication device to transmit signals, during a second period of time, on a second number of tones distributed uniformly in a second frequency band which is wider than said first frequency band, said second number of tones being the same as said first number of tones.

40. The non-transitory computer readable medium of claim 39, wherein tones in said second frequency band have a wider tone width than tones in said first frequency band.

41. A wireless communication device, comprising:
a processor configured to control said communications device to:
transmit signals, during a first period of time, on a first number of tones distributed uniformly in a first frequency band; and
transmit signals, during a second period of time, on a second number of tones distributed uniformly in a second frequency band; which is wider than said first frequency band, said second number of tones being the same as said first number of tones; and
memory coupled to said processor.

42. The wireless communication device of claim 41, wherein tones in said second frequency band have a wider tone width than tones in said first frequency band.

* * * * *